(12) United States Patent
Tsuchida et al.

(10) Patent No.: US 8,966,145 B2
(45) Date of Patent: Feb. 24, 2015

(54) DATA CONVERSION APPARATUS AND METHOD

(75) Inventors: Ryusuke Tsuchida, Tokyo (JP); Akira Ueno, Tokyo (JP); Masami Shimamura, Hanno (JP); Yoshinobu Tanaka, Tokyo (JP); Takashi Yanada, Tokyo (JP); Tomoyuki Sengoku, Tokyo (JE)

(73) Assignee: Olympus Corporation, Tokyo (JP)

( * ) Notice: Subject to any disclaimer, the term of this patent is extended or adjusted under 35 U.S.C. 154(b) by 391 days.

(21) Appl. No.: 13/425,952

(22) Filed: Mar. 21, 2012

(65) Prior Publication Data

US 2012/0246361 A1 Sep. 27, 2012

(30) Foreign Application Priority Data

Mar. 24, 2011 (JP) ................................. 2011-066059

(51) Int. Cl.
*G06F 13/12* (2006.01)
*G06T 1/60* (2006.01)
*G06F 13/28* (2006.01)

(52) U.S. Cl.
CPC . *G06T 1/60* (2013.01); *G06F 13/28* (2013.01); *Y02B 60/1228* (2013.01)
USPC .................. 710/65; 710/30; 710/35; 710/52; 710/54; 710/66; 713/320; 365/227

(58) Field of Classification Search
None
See application file for complete search history.

(56) References Cited

U.S. PATENT DOCUMENTS 8,482,438 B2 * 7/2013 Yanada et al. .................. 341/58
8,732,363 B2 * 5/2014 Shimamura et al. ............ 710/66

2001/0050874 A1 * 12/2001 Al-Shamma et al. ......... 365/227
2006/0174158 A1 * 8/2006 Check et al. .................... 714/10
2008/0143732 A1 6/2008 Shiozaki
2008/0282001 A1 11/2008 Vogelsang

FOREIGN PATENT DOCUMENTS

JP 2002-200795 A 7/2002
JP 2007-312358 A 11/2007
JP 2008-119900 A 5/2008

OTHER PUBLICATIONS

"Shift Invert coding (SINV) for low power VLSI" by Jayapreetha Natesan and Damu Radhakrishnan, Proceedings of the EUROMICRO Systems on Digital System Design, 2004.*
Japanese Office Action dated Dec. 2, 2014, issued in Japanese Patent Application No. 2011-066059, w/English translation (4 pages).

* cited by examiner

*Primary Examiner* — Steven Snyder
(74) *Attorney, Agent, or Firm* — Westerman, Hattori, Daniels & Adrian, LLP

(57) ABSTRACT

A data processing apparatus may include: a data conversion unit configured to designate one-transfer data as one transfer unit and designate a predetermined number of transfer units as one conversion unit when a plurality of input data sequentially input is converted into transfer data of which the number of bits is the same as that of a data bus having a predetermined number of bits, and the transfer data is sequentially transferred, and arrange the input data in the transfer data within the conversion unit. The data conversion unit may include: a data generation unit, a first data arrangement change unit, and a first data selection unit configured to sequentially select the changed data in which the position of the input data is changed by the first data arrangement change unit and output the selected changed data as the transfer data in the data conversion unit.

12 Claims, 21 Drawing Sheets

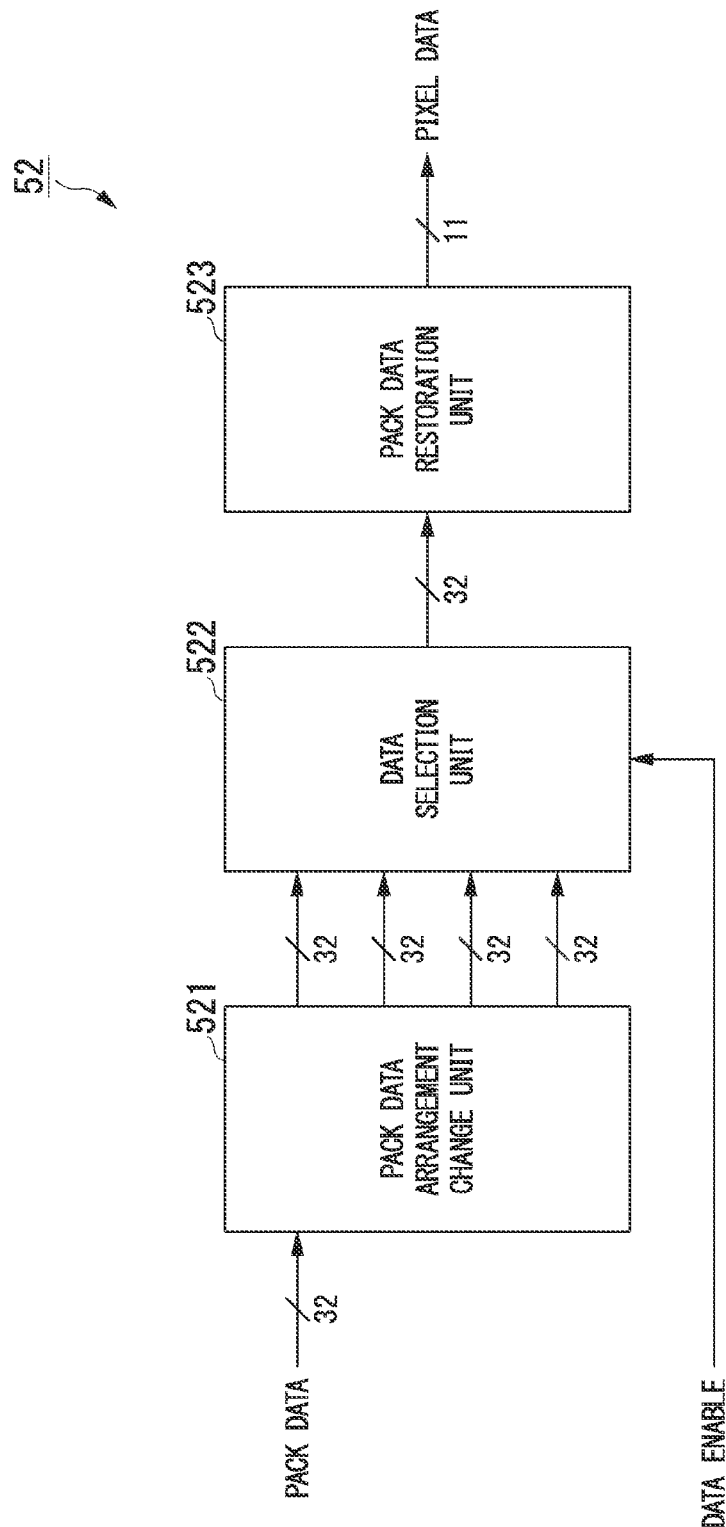

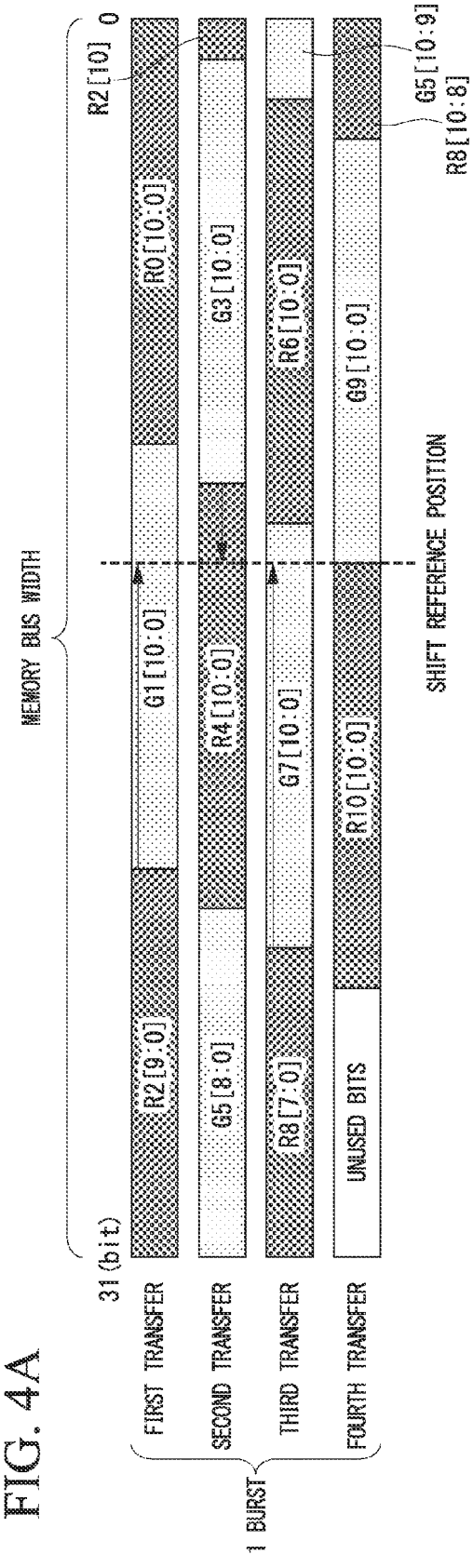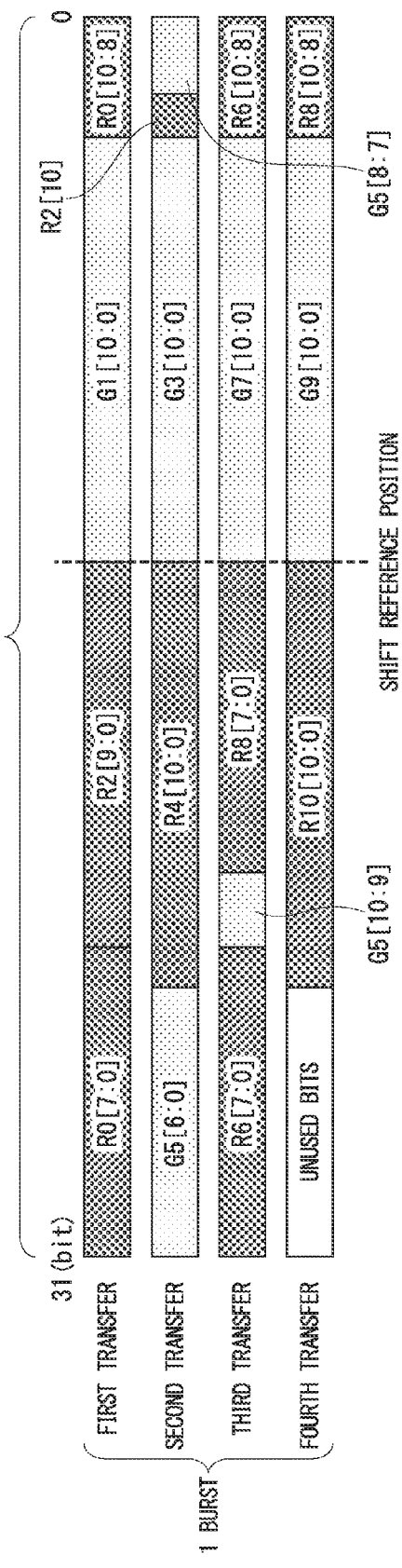

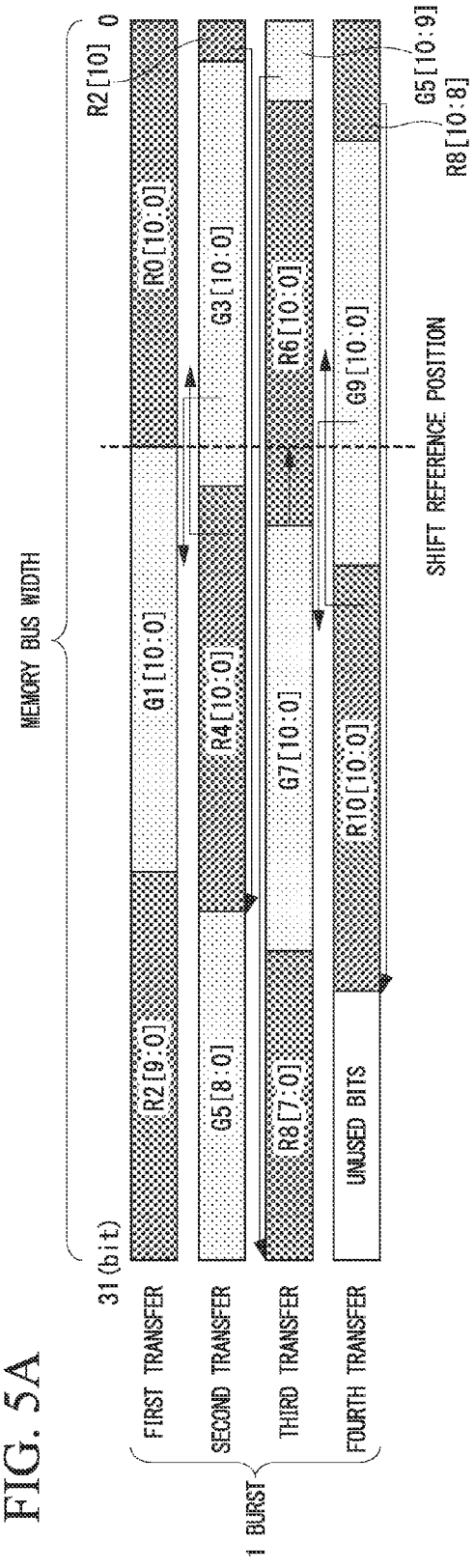
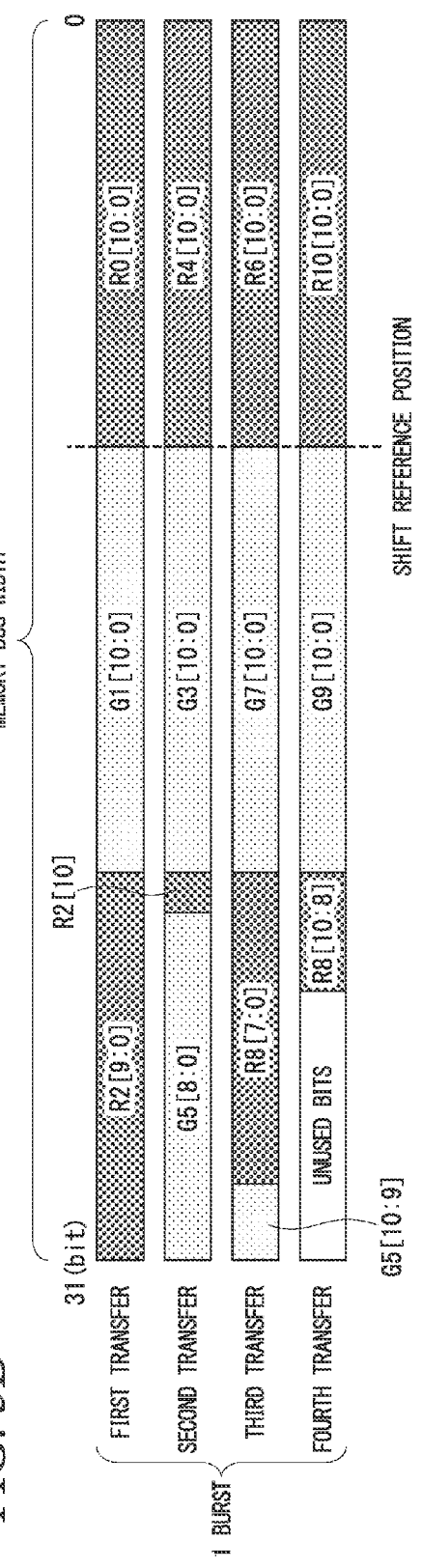

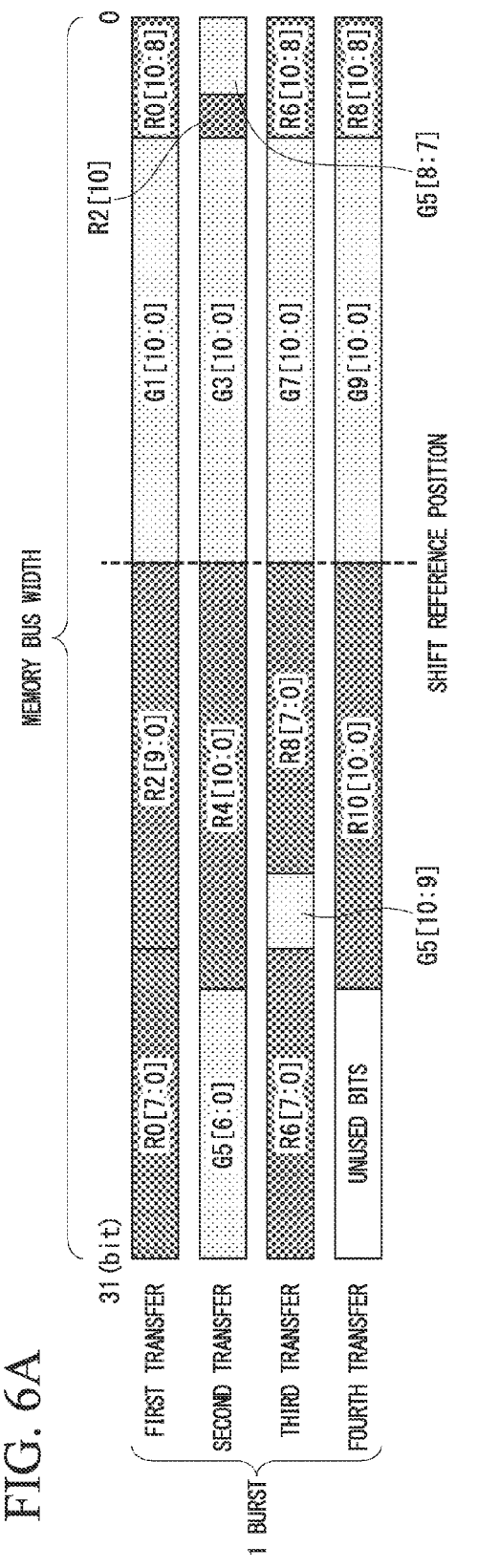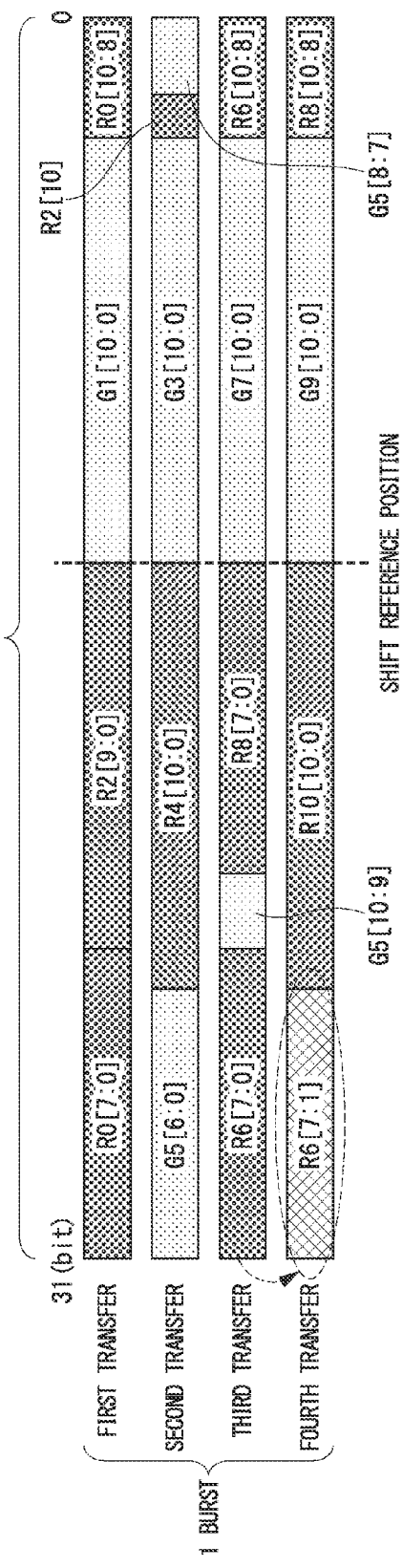

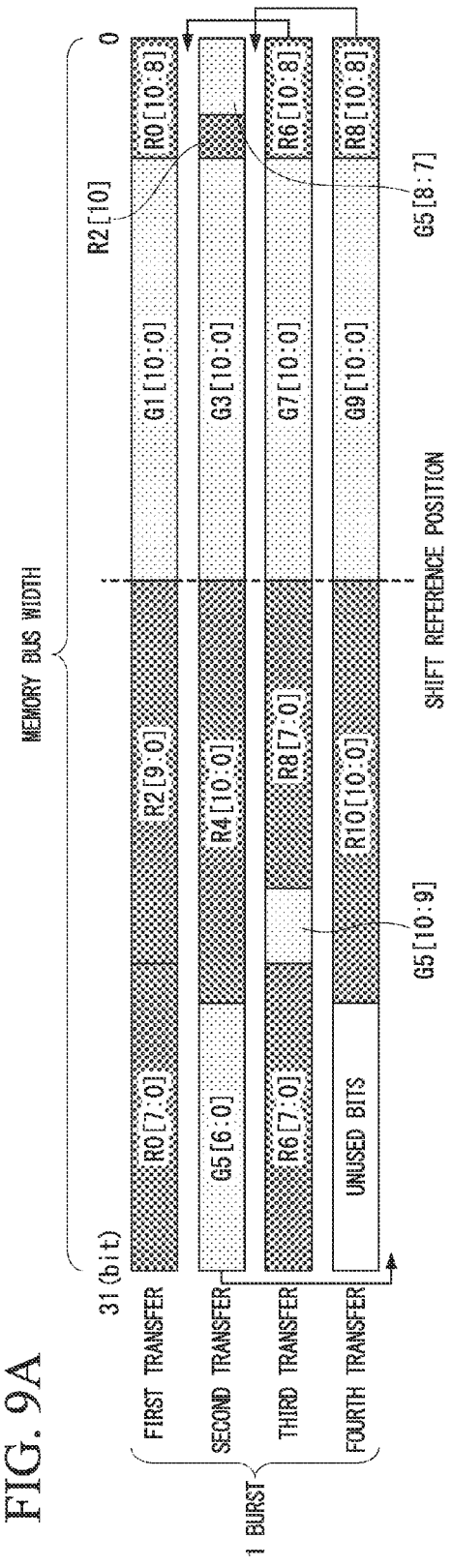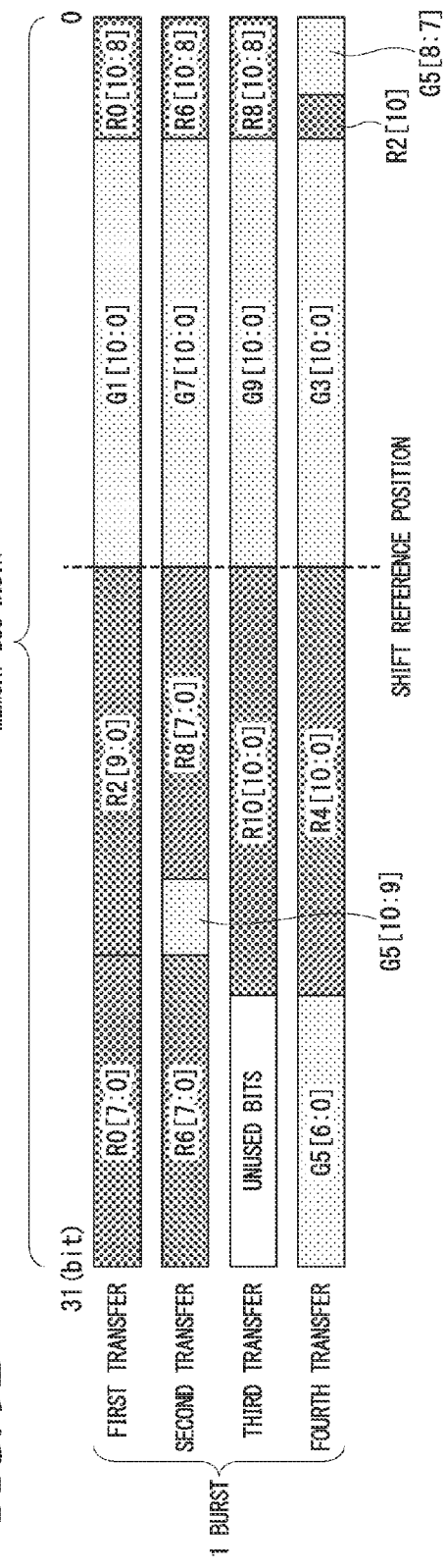

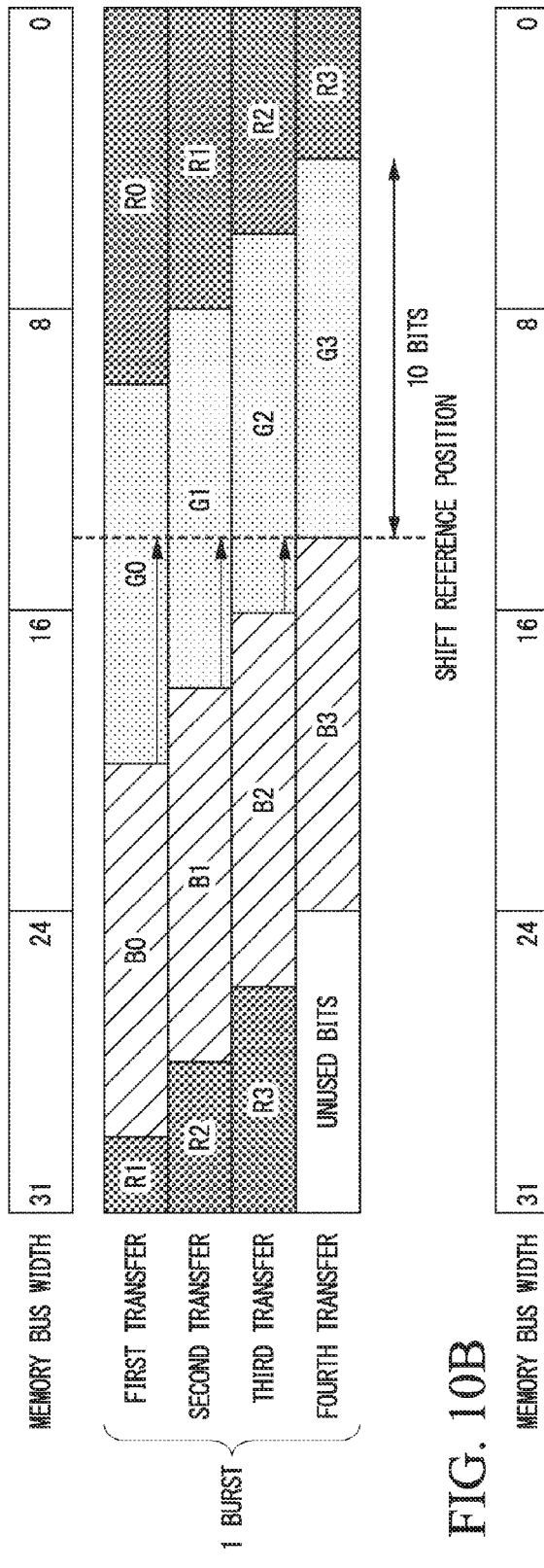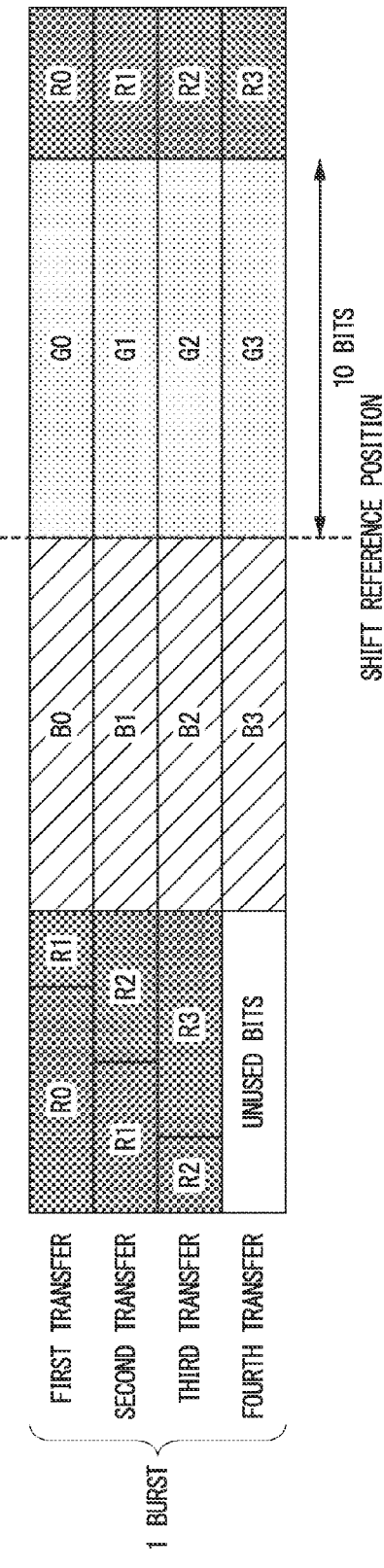
FIG. 10A
FIG. 10B

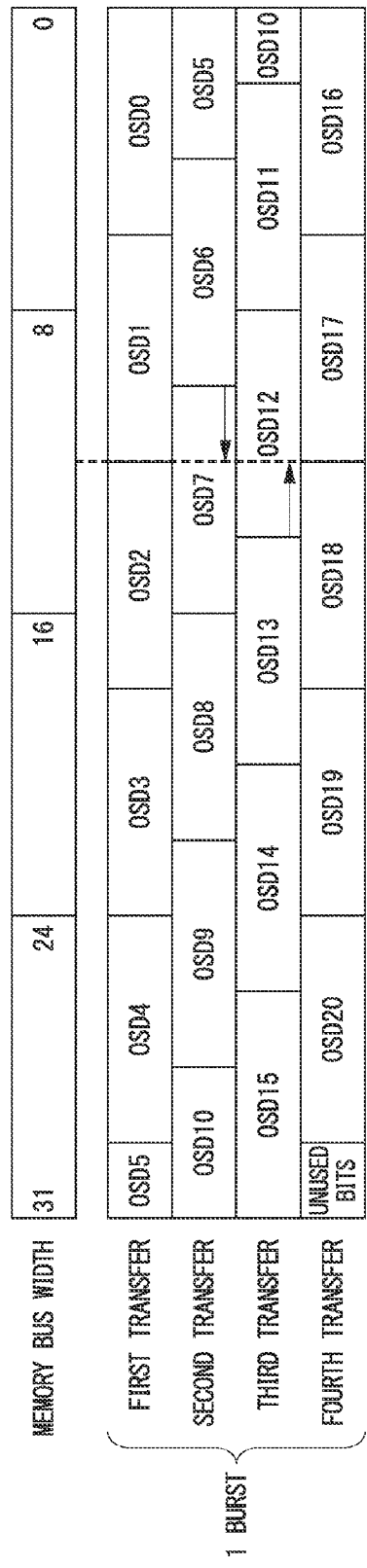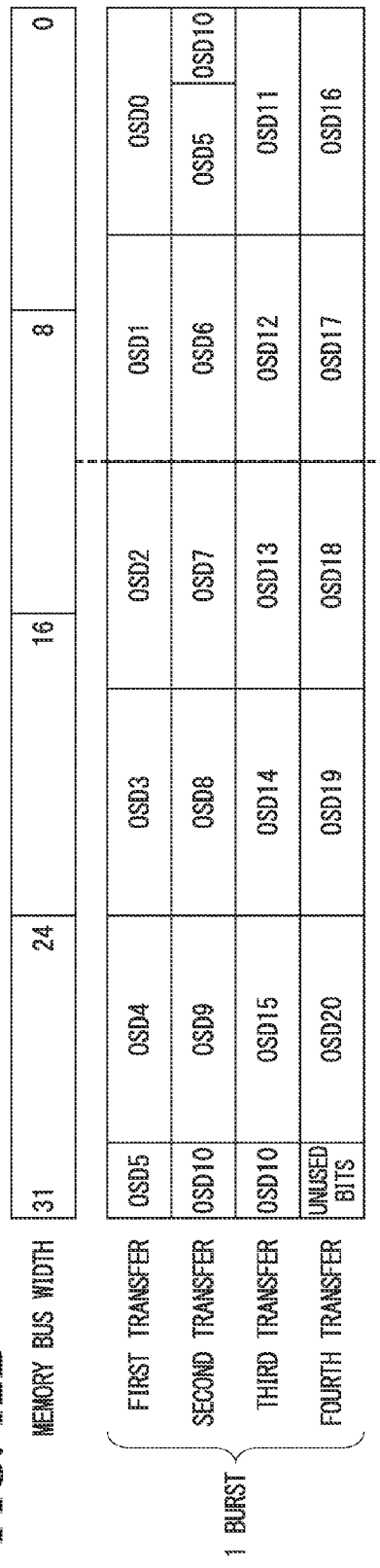

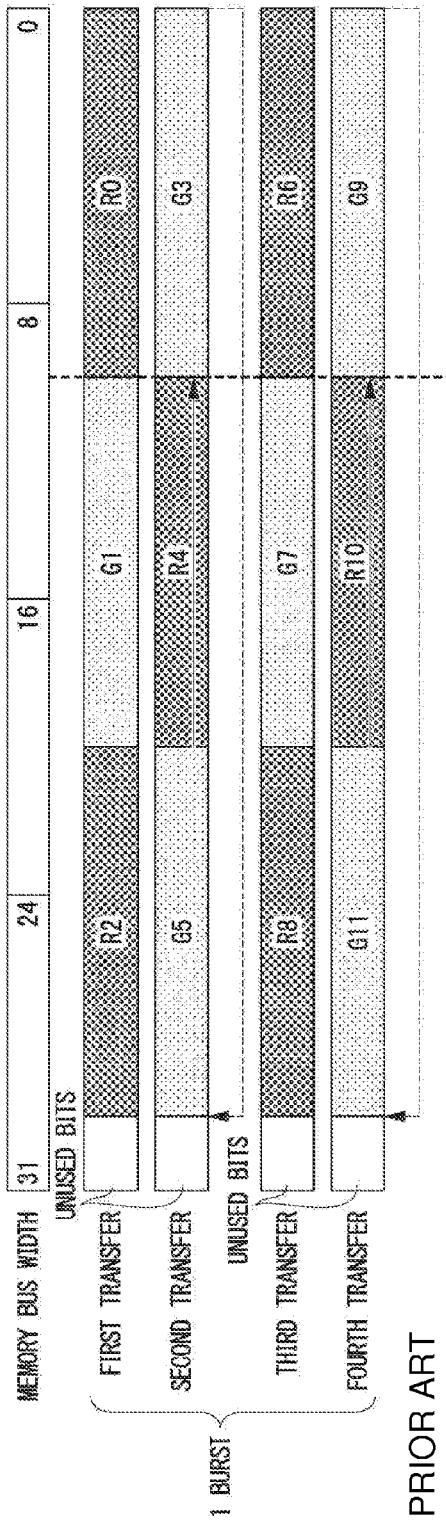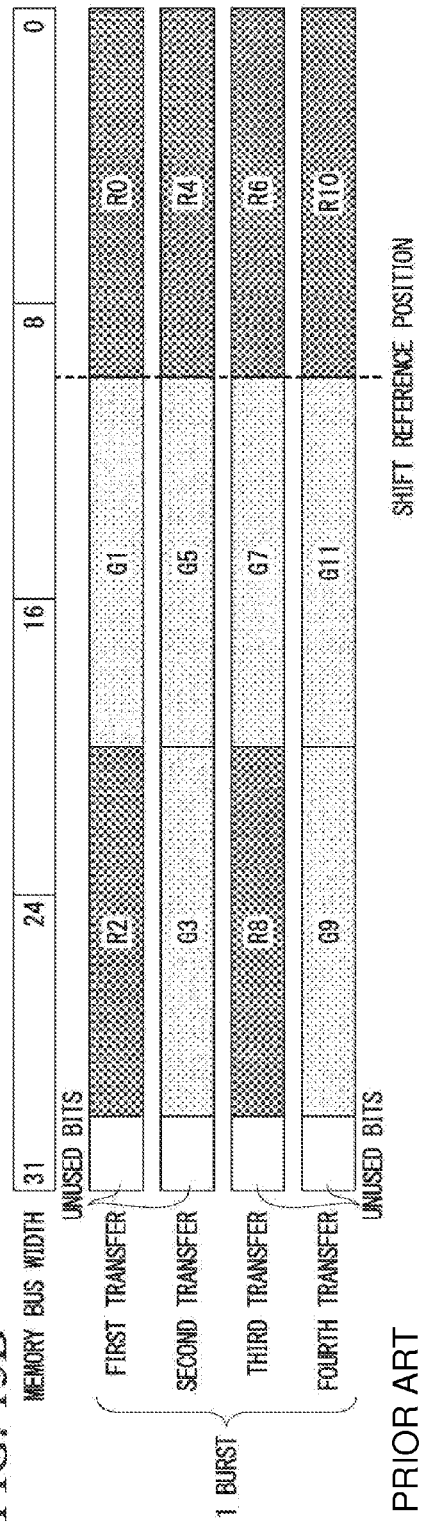

FIG. 17

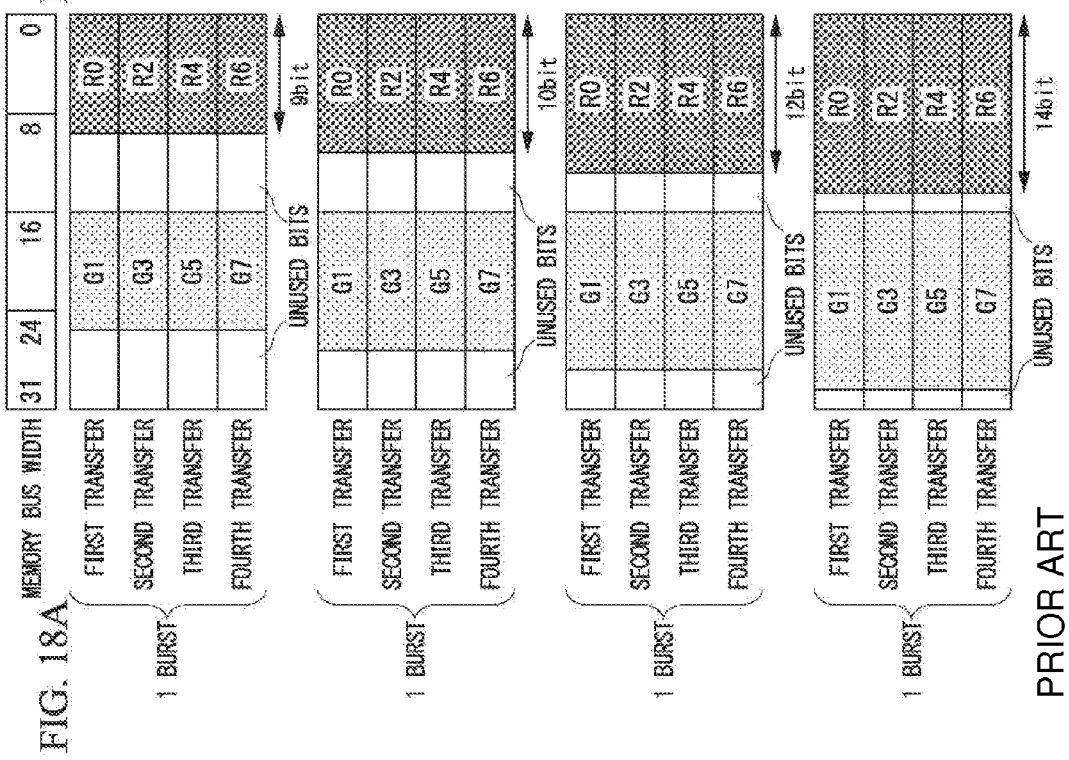

DATA CONVERSION APPARATUS AND METHOD

BACKGROUND OF THE INVENTION

1. Field of the Invention

The present invention relates to a data processing apparatus and a data processing method.

Priority is claimed on Japanese Patent Application No. 2011-066059, filed Mar. 24, 2011, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

An image pickup device, such as a still camera, a video camera, a medical endoscope camera, or an industrial endoscope camera, processes image data containing data of a great number of pixels (hereinafter referred to as "pixel data") with the increase of the number of pixels and speed of the image pickup device. In such an image pickup device, a memory for temporarily storing image data obtained by photographing is used when each processing block in the image pickup device processes the image data. Image data in each processing step is temporarily stored in the memory.

FIG. 16 is a block diagram illustrating a schematic configuration of an image pickup device in accordance with the related art. For example, image data processing in a photographing operation of the image pickup device shown in FIG. 16 is performed in the following order.

(Step 1)

First, an image pickup processing unit, for example, transmits image data obtained by a CCD (Charge Coupled Device) solid-state image pickup device to a memory via an output DMA (Direct Memory Access) unit to temporarily store the image data.

(Step 2)

Subsequently, an image processing unit reads the image data temporarily stored in the memory via an input DMA unit. The image processing unit performs image processing for recording or display on the read image data. The image processing unit then transmits the processed image data to the memory via the output DMA unit to temporarily store the image data.

(Step 3)

Subsequently, a display processing unit reads the image data subjected to image processing for display via an input DMA unit and causes a display device to display the image data.

Thus, in the image pickup device, the preceding processing block temporarily stores the image data in the memory. The subsequent processing block reads the image data stored in the memory and performs a next process. Thus, as respective processing blocks in the image pickup device perform delivery of the image data, which is a processing target, through the memory, processes of the image pickup device are sequentially performed.

In recent years, it has been desirable for an image pickup device such as a still camera, a video camera or the like to be able to be continuously used for a long time. Accordingly, there is a need for a technique for reducing power consumption of an electrical circuit of the image pickup device. One method of reducing the power consumption of the image pickup device includes a method of increasing a transfer rate for image data between each processing block (electrical circuit) and a memory. The increase of the transfer rate for image data, for example, may be realized by increasing a frequency of an operation clock of the image pickup device or shortening a transfer period of time of the image data between the processing block and the memory. This method reduces power consumption due to transfer of the image data by increasing the transfer rate of the image data.

As a technique of shortening a transfer period of time of image data between the processing block and the memory, a packing technique as disclosed in Japanese Unexamined Patent Application, First Publication No. 2007-312358 (hereinafter referred to as Patent Document 1) is known. The packing technique disclosed in Patent Document 1 is a technique of extending a bus width of a data bus used when each pixel data in the image data is transferred to a memory and arranging (packing) a plurality of adjacent pixel data in the data bus to transfer a plurality of pixel data at a single time. Using this technique, the number of data transfers required to transfer all pixel data can be further reduced as compared with conventional data transfer in which pixel data is transferred pixel by pixel, and the period of time for data transfer of the image data can be shortened. FIG. 17 is a diagram illustrating an example of an arrangement of image data. For example, when pixel data as shown in FIG. 17 obtained from a 16×16 Bayer arrangement CCD is transferred to a memory, in the packing technique disclosed in Patent Document 1, pixel data for 4 pixels is one transfer unit, thus reducing a transfer period of the image data to ¼. Accordingly, it is possible to reduce power consumption of an electrical circuit in the image pickup device, unlike a case in which pixel data is transferred to the memory pixel by pixel.

As a technique of further shortening the transfer period of image data, a packing method using burst transfer of DMA is considered. This is a method in which one burst, which is a memory access unit at a prescribed certain number of cycles, is considered a pixel data packing unit. FIGS. 18A and 18B are diagrams illustrating an example of pixel data packing in accordance with the related art. FIG. 18A illustrates a packing method disclosed in Patent Document 1. An example in which the pixel data shown in FIG. 17 is packed is shown in FIG. 18A. FIG. 18B illustrates an example in which the pixel data shown in FIG. 17 is packed in a burst unit. An example in which a bus width (hereinafter referred to as "memory bus width") of a data bus used when the pixel data is transferred to the memory (hereinafter referred to as "memory bus") is 32 bits, and memory access for one cycle in burst transfer (hereinafter referred to as "one transfer") is performed four times, that is, one burst transfer is performed through four transfers, is shown in FIGS. 18A and 18B. An example in which resolution of pixel data of one pixel, that is, a bit number of the pixel data is 9, 10, 12, and 14 from top to bottom, is shown in FIGS. 18A and 18B.

In the packing method disclosed in Patent Document 1 shown in FIG. 18A, pixel data for two pixels per one transfer can be arranged on a memory bus, and pixel data for 8 pixels per one burst can be transferred to the memory. On the other hand, in the burst unit-based packing method shown in FIG. 18B, pixel data for 14, 12, 10, and 9 pixels can be transferred to the memory. In the packing method disclosed in Patent Document 1, since pixel data is arranged (packed) in the memory bus width, that is, in a unit of one transfer, a sum of bit numbers of a plurality of arranged pixel data must not exceed the memory bus width. Accordingly, in the packing method disclosed in Patent Document 1, there are bits to which pixel data cannot be allocated (hereinafter referred to as "unused bits") within the memory bus width. On the other hand, in the burst unit-based packing method, since pixel data is arranged (packed) in units of bursts, even when a sum of bit numbers of a plurality of arranged pixel data exceeds the memory bus width, the pixel data can be arranged (packed) in a next transfer as long as the sum does not exceed one burst, as in FIG. 18B. That is, in the burst unit-based packing method, even when the memory bus width is not an integer times the resolution of pixel data, the pixel data can be arranged (mapped) over one transfer unit, which can reduce the number of unused bits. Accordingly, in the burst unit-based packing method, much pixel data can be transferred to the memory in the same time, that is, the transfer period of time of the image data can be shortened, and the power consumption of the electrical circuit in the image pickup device can be further reduced, as compared with the packing method disclosed in Patent Document 1.

In general, when data change (change (inversion) of data "0"→"1" or "1"→"0") is less, power consumption is known to be lower. Accordingly, reducing the power consumption of the image pickup device by reducing the data change on the memory bus between each processing block (electrical circuit) and a memory in an image pickup device is also considered. FIGS. 19A, 19B, 19C and 19D are diagrams illustrating a relationship between the data change on the data bus (memory bus) between the processing block and the memory in the image pickup device and the power consumption. FIG. 19A illustrates an example in which a bus width of a memory bus between the image pickup processing unit and the memory in the image pickup device shown in FIG. 16 is 32 bits. The data change on the memory bus is schematically shown in FIGS. 19B to 19D. In the example of FIGS. 19A, 19B, 19C and 19D, power consumption is lowest in the case of FIG. 19B in which there is no data change on the memory bus, and highest in the case of FIG. 19D in which there are the most data changes on the memory bus.

It can be seen from the above that if there is a great amount of change in pixel data between two continuous transfers (e.g., pixel data in first and second transfers of each burst transfer shown in FIGS. 18A and 18B) in the burst transfer between each processing block and the memory in the image pickup device, power consumption due to the transfer of the image data increases. That is, the power consumption due to the transfer of the image data varies in proportion to the number of the same bits (bit number) on the memory bus changing between the two transfers.

In general, there is expected to be a small amount of change in data between adjacent pixels in image data, and bits whose values are being inverted are expected to be less than bits whose values are not being inverted when the same bits of each pixel data of adjacent pixels are compared. FIGS. 20A and 20B are diagrams illustrating an example of a data arrangement state in a pixel data packing method in accordance with the related art. Here, when the packing method disclosed in Patent Document 1 and the burst unit-based packing method, which are shown in FIGS. 18A and 18B, are compared with each other, the power consumption due to the transfer of the image data is lower in the packing method disclosed in Patent Document 1 in which the same bits are aligned in pixel data with the same colors, as shown in FIGS. 20A and 20B. Further, FIGS. 20A and 20B show a case in which the bit number of pixel data of one pixel is 9 in the packing method disclosed in Patent Document 1 and the burst unit-based packing method shown in FIGS. 18A and 18B.

More specifically, in the packing method disclosed in Patent Document 1 shown in FIG. 20A, least significant bits of the memory bus shown in a range A are all the same bits (least significant bits) of pixel data with the same colors. On the other hand, in the burst unit-based packing method shown in FIG. 20B, least significant bits of the memory bus shown in a range B are all different bits of pixel data having different colors. It can be seen from this that, when locations of bits of pixel data arranged on the memory bus are made different between two continuous transfers by packing the image data in a burst unit, a change amount of the same bits on the memory bus becomes great and the power consumption due to the transfer of the image data increases.

That is, in the packing method disclosed in Patent Document 1 shown in FIG. 20A, the power consumption due to the transfer of the image data is low, but data transfer efficiency is low. In the burst unit-based packing method shown in FIG. 20B, the data transfer efficiency is low, but the power consumption due to the transfer of the image data is high.

Thus, more pixel data is arranged on the memory bus when packing the pixel data into the burst units. As a result, the transfer period of time of the pixel data can be shortened and the power consumption due to transfer of the image data can be reduced. However, since locations of bits of the pixel data arranged on the memory bus are different between two continuous transfers, sufficient reduction of the power consumption due to the transfer of the image data cannot be obtained.

FIG. 21 is a diagram illustrating another example of a data arrangement state in the pixel data packing method in accordance with the related art. In the packing method disclosed in Patent Document 1, for example, pixel data for 3 pixels can be arranged (packed) in one transfer to pack the pixel data, as shown in FIG. 21. However, in this case, for example, least significant bits of a memory bus shown in a range C are the same bits (least significant bits) of the pixel data, but are pixel data having different colors. Pixel data having different colors is highly likely to be greatly different in value, and even in the packing method disclosed in Patent Document 1, the power consumption due to the transfer of the image data is not reduced due to the pixel data arrangement in one transfer.

SUMMARY

The present invention provides a data processing apparatus and a data processing method capable of reducing power consumption due to data transfer while maintaining data transfer efficiency.

A data processing apparatus may include: data conversion unit configured to designate one-transfer data as one transfer unit and designate a predetermined number of transfer units as one conversion unit when a plurality of input data sequentially input is converted into transfer data of which the number of bits is the same as that of a data bus having a predetermined number of bits, and the transfer data is sequentially transferred, and arrange the input data in the transfer data within the conversion unit. The data conversion unit may include: a data generation unit configured to generate first transfer data by sequentially arranging the input data on the data bus; a first data arrangement change unit configured to generate changed data in which a position of the input data arranged within the first transfer data is changed so that the same bit of the input data having the same type of information in the plurality of input data arranged in the first transfer data is continuously transferred in the same bit of the data bus; and a first data selection unit configured to sequentially select the changed data in which the position of the input data is changed by the first data arrangement change unit and output the selected changed data as the transfer data in the data conversion unit.

A reference position for shifting a predetermined bit position of the input data having a predetermined type of information included in the first transfer data may be predetermined so that each bit of the input data included in the changed data during two continuous transfers included in the same conversion unit is in substantially the same position. The first data arrangement change unit may shift the predetermined bit position of the input data having the predetermined type of information arranged within the first transfer data for each first transfer data to the reference position, and rearrange each bit of the input data arranged within the first transfer data exceeding a width of the data bus due to the shift of the first transfer data in an opposite-side bit of the first transfer data so that the input data is circulated within the first transfer data.

A reference position for reordering the input data having a predetermined type of information included in the first transfer data is predetermined by designating the input data having the same type of information as a reordering unit so that each bit of the input data included in the changed data during two continuous transfers included in the same conversion unit is in substantially the same position. The first data arrangement change unit may perform the reordering in the reordering unit so that the predetermined bit position of the input data having the predetermined type of information arranged within the first transfer data becomes the reference position for each first transfer data.

The reference position may be preset so that the same bit of two adjacent input data having the same type of information is allocated to the same bit in the changed data of the transfer unit.

The reference position may be set so that a ratio for a more significant bit of the input data allocated to the same bit of the changed data of two continuous transfer units included in the same conversion unit is increased.

After arrangement of the input data within the first transfer data is changed, the same data as the same bit of the changed data of the transfer unit immediately before inclusion in the same conversion unit is allocated to remaining bits of the changed data in which the input data is not arranged.

When selecting the changed data input from the first data arrangement change unit, the first data selection unit selects the changed data in a predetermined selection order so that a ratio of allocation to the same bit of the changed data of two continuous transfer units included in the same conversion unit is increased.

After selecting the changed data input from the first data arrangement change unit, when bits remain in which the input data is not arranged within the selected changed data, the first data selection unit allocates the same data as the same bit of the changed data of the transfer unit either immediately after or before inclusion in the same conversion unit to the remaining bits.

A data processing apparatus may include: a data reverse conversion unit configured to convert a plurality of input data to transfer data having the same number of bits as a data bus of which the number of bits is predetermined, to designate one-transfer data as one transfer unit, to designate a predetermined number of transfer units as one conversion unit, and to perform restoration to a plurality of original input data by sequentially reversely converting transfer data sequentially transferred for each conversion unit. The data reverse conversion unit may include: a second data arrangement change unit configured to generate changed data in which a position of the input data arranged within first transfer data is changed so that a data processing apparatus of a transfer source of the transfer data generates the first transfer data as a transfer data by sequentially arranging the input data on the data bus and the same bit of the input data having the same type of information in the plurality of input data arranged within the first transfer data is continuously transferred in the same bit of the data bus, sequentially select the changed data in which arrangement of the input data is changed, and perform restoration to the first transfer data by changing a position of the input data arranged within the changed data to an original arrangement position of the input data so that the selected changed data is input from the data bus and arrangement of a plurality of input data arranged within the input changed data is restored to an original position; a second data selection unit configured to sequentially select the first transfer data in which arrangement of the input data is restored to the original arrangement by the second data arrangement change unit; and a data restoration unit configured to restore the input data included in the first transfer data selected by the second data selection unit to each input data.

The changed data may be data in which a position of a predetermined bit of the input data having a predetermined type of information included in the first transfer data is shifted to a predetermined reference position so that bits of the input data included in the transfer data during two continuous transfers included in the same conversion unit are in substantially the same position. The second data arrangement change unit may shift the position of the predetermined bit of the input data having the predetermined type of information arranged within the first transfer data to an original position for each changed data, and rearrange bits of the input data arranged within the changed data exceeding a width of the data bus due to a shift of the changed data in opposite-side bits of the changed data so that the input data is circulated within the changed data.

The changed data may be data in which a position of a predetermined bit of the input data having a predetermined type of information included in the first transfer data is reordered to a predetermined reference position by designating the input data having the same type of information as a reordering unit so that bits of the input data included in the transfer data during two continuous transfers included in the same conversion unit are in substantially the same position. The second data arrangement change unit may perform reordering in the reordering unit so that the position of the predetermined bit of the input data having the predetermined type of information arranged within the first transfer data becomes an original position for each changed data.

The reference position may be preset so that the same bit of two adjacent input data having the same type of information within the input data is allocated to the same bit in the changed data of the transfer unit.

The reference position may be set so that a ratio for a more significant bit of the input data allocated to the same bit of the changed data of two continuous transfer units included in the same conversion unit is increased.

The same data as the same bit of the changed data of the transfer unit immediately before inclusion in the same conversion unit may be allocated to the changed data.

The same data as the same bit of the changed data of the transfer unit either immediately before or after inclusion in the same conversion unit may be allocated to the changed data.

When selecting the first transfer data input from the second data arrangement change unit, the second data selection unit selects the first transfer data in a predetermined selection order so that the first transfer data of two continuous transfer units included in the same conversion unit is in an original order.

A data processing method may include: a data conversion step of designating one-transfer data as one transfer unit and designating a predetermined number of transfer units as one conversion unit when a plurality of input data sequentially input is converted into transfer data of which the number of bits is the same as that of a data bus having a predetermined number of bits, and the transfer data is sequentially transferred, and arranging the input data in the transfer data within the conversion unit. The data conversion step may include: a data generation step of generating first transfer data by sequentially arranging the input data on the data bus; a first data arrangement change step of generating changed data in which a position of the input data arranged within the first transfer data is changed so that the same bit of the input data having the same type of information in the plurality of input data arranged in the first transfer data is continuously transferred in the same bit of the data bus; and a first data selection step of sequentially selecting the changed data in which the position of the input data is changed by the first data arrangement change step and outputting the selected changed data as the transfer data in the data conversion step.

A data processing method may include: a data reverse conversion step for converting a plurality of input data to transfer data having the same number of bits as a data bus of which the number of bits is predetermined, designating one-transfer data as one transfer unit, designating a predetermined number of transfer units as one conversion unit, and performing restoration to a plurality of original input data by sequentially reversely converting transfer data sequentially transferred for each conversion unit. The data reverse conversion step may include: a second data arrangement change step of generating changed data in which a position of the input data arranged within first transfer data is changed so that a data processing apparatus of a transfer source of the transfer data generates the first transfer data by sequentially arranging the input data on the data bus as transfer data and the same bit of the input data having the same type of information in the plurality of input data arranged within the first transfer data is continuously transferred in the same bit of the data bus, sequentially selecting the changed data in which arrangement of the input data is changed, and performing restoration to the first transfer data by changing a position of the input data arranged within the changed data to an original arrangement position of the input data so that the selected changed data is input from the data bus and arrangement of a plurality of input data arranged within the input changed data is restored to an original position; a second data selection step of sequentially selecting the first transfer data in which arrangement of the input data is restored to original arrangement by the second data arrangement change step; and a data restoration step of restoring the input data included in the first transfer data selected by the second data selection step to each input data.

According to the present invention, it is possible to reduce power consumption due to data transmission while maintaining data transfer efficiency.

BRIEF DESCRIPTION OF THE DRAWINGS

The above features and advantages of the present invention will be more apparent from the following description of certain preferred embodiments taken in conjunction with the accompanying drawings, in which:

FIG. 3 is a block diagram illustrating a schematic configuration of a data reverse conversion unit of a first configuration included in the image pickup device in accordance with the first preferred embodiment of the present invention;

FIGS. 4A and 4B are diagrams illustrating a first data arrangement method in the data conversion unit of the first configuration;

FIGS. 5A and 5B are diagrams illustrating a second data arrangement method in the data conversion unit of the first configuration;

FIGS. 6A and 6B are diagrams illustrating a third data arrangement method in the data conversion unit of the first configuration;

FIGS. 9A and 9B are diagrams illustrating the data output order change method in the data conversion unit of the second configuration;

FIGS. 10A and 10B are diagrams illustrating an example in which a data arrangement method by the data conversion unit included in the image pickup device in accordance with the first preferred embodiment of the present invention is applied to other image data;

FIGS. 12A and 12B are diagrams illustrating an example in which the data arrangement method by the data conversion unit included in the image pickup device in accordance with the first preferred embodiment of the present invention is further applied to other image data;

FIGS. 15A and 15B are diagrams illustrating an example in which the data arrangement method by the data conversion unit included in the image pickup device in the image pickup device in accordance with the first preferred embodiment is applied to transfer pack data arranged by the data packing method of the related art;

FIG. 17 is a diagram illustrating an example of an arrangement of image data;

FIGS. 18A and 18B are diagrams illustrating an example of pixel data packing in accordance with the related art;

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

Figure 1:
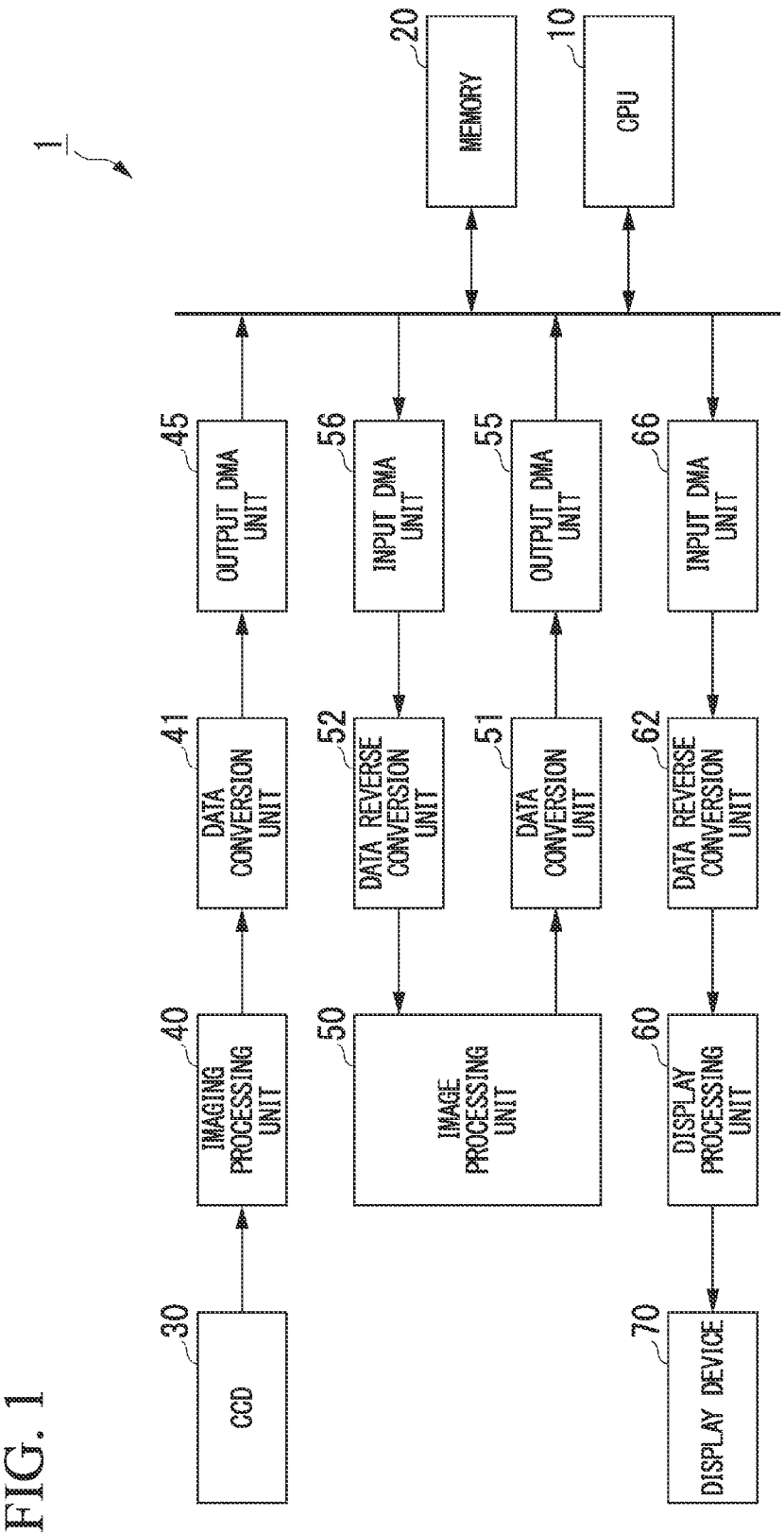
FIG. 1 is a block diagram illustrating a schematic configuration of an image pickup device in accordance with a first preferred embodiment of the present invention.

FIG. 1 is a block diagram illustrating a schematic configuration of an image pickup device in accordance with a first preferred embodiment of the present invention. The image pickup device 1 shown in FIG. 1 includes a CPU 10, a memory 20, a CCD 30, an image pickup processing unit 40, an image processing unit 50, a display processing unit 60, a display device 70, data conversion units 41 and 51, data inverse-conversion units 52 and 62, output DMA units 45 and 55, and input DMA units 56 and 66. The image pickup device 1 has a function of recording image data obtained through photographing. However, for convenience of a description, a case in which image data obtained through photographing is displayed will be described hereinafter. Only a connection of a memory bus that is a data bus associated with pixel data delivery between respective components (processing blocks) in the image pickup device 1 is shown in FIG. 1.

The CPU 10 is a control device that performs overall control of the image pickup device 1.

The memory 20, for example, is a memory such as a DRAM (Dynamic Random Access Memory) for temporarily storing pixel data processed by each processing block in the image pickup device 1. Pixel data in each processing step of each processing block in the image pickup device 1 is temporarily stored in the memory 20.

The CCD 30, for example, is a solid-state image pickup device having a Bayer arrangement for converting incident subject light into an image signal. The CCD 30 outputs a subject pixel signal to the image pickup processing unit 40.

The image pickup processing unit 40 performs prescribed signal processing on the pixel signal input from the CCD 30 to generate image data.

The image processing unit 50 performs various image processing in the image pickup device 1 on the image data generated by the image pickup processing unit 40 to generate image data.

The display processing unit 60 converts the image data image-processed by the image processing unit 50 into display data according to the display device 70. The display processing unit 60 outputs the converted display data to the display device 70.

The display device 70, for example, is a display device such as a liquid crystal display for displaying the display data.

In the image pickup device 1 in accordance with the first preferred embodiment of the present invention, a pixel signal for a subject captured by the CCD 30 is processed by the image pickup processing unit 40, the image processing unit 50, and then the display processing unit 60, and displayed on the display device 70. In this case, the image data in each processing step is delivered between the respective processing blocks via the memory 20. The data conversion units 41 and 51, the data inverse-conversion units 52 and 62, the output DMA units 45 and 55, and the input DMA units 56 and 66 in the image pickup device 1 are processing blocks associated with delivery of the image data in each processing step.

The data conversion unit 41 or 51 arranges respective pixel data in the image data input from a preceding processing block (the image pickup processing unit 40 or the image processing unit 50 in accordance with the first preferred embodiment of the present invention shown in FIG. 1) in respective bits of the memory bus using a prescribed arranging (packing) method. Configurations of the data conversion units 41 and 51 and a pixel data packing method in the data conversion units 41 and 51 will be described in detail later.

The output DMA unit 45 or 55 writes (stores) the image data consisting of the pixel data packed in respective bits of the memory bus by the data conversion unit 41 or 51 to the memory 20 through DMA access.

The input DMA unit 56 or 66 reads the image data stored in the memory 20 through DMA access and outputs the read image data to the data inverse-conversion unit 52 or 62.

The data inverse-conversion unit 52 or 62 restores the pixel data contained in the image data input from the DMA unit 56 or 66 to original image data using a method reverse to the prescribed arranging (packing) method and outputs the original image data to a subsequent processing block (the image processing unit 50 or the display processing unit 60 in accordance with the first preferred embodiment of the present invention shown in FIG. 1). Configurations of the data inverse-conversion units 52 and 62 will be described in detail later.

Here, image data processing in the image pickup device 1 shown in FIG. 1 will be described. In a photographing operation in the image pickup device 1, image data processing is performed in the following order.

(Step 1)

First, the image pickup processing unit 40 performs prescribed signal processing on a pixel signal for a subject captured by the CCD 30 to generate image data (e.g., image data according to a pixel arrangement of the CCD 30). The image pickup processing unit 40 transfers the generated image data to the memory 20 via the data conversion unit 41 and the output DMA unit 45 and temporarily stores the image data.

(Step 2)

Subsequently, the image processing unit 50 reads the image data temporarily stored in the memory 20 via the input DMA unit 56 and the data inverse-conversion unit 52. The image processing unit 50 performs image processing for recording or display on the read image data to generate image data (e.g., RGB data, or YCbCr data having a YC422 dot sequential format). Then, the image processing unit 50 transfers the generated image data to the memory 20 via the data conversion unit 51 and the output DMA unit 55 again and temporarily stores the image data.

(Step 3)

Subsequently, the display processing unit 60 reads the image data subjected to image processing for displaying by the image processing unit 50 or image data for OSD (On-Screen Display) display separately stored in the memory 20, via the input DMA unit 66 and the data inverse-conversion unit 62, and causes the display device 70 to display the image data.

When the image pickup device 1 records the image data obtained through photographing, a recording processing unit for performing an image data recording process, which is not shown, reads the image data subjected to image processing for recording by the image processing unit 50 via an input DMA unit and a data inverse-conversion unit, which are not shown, and records the read image data for recording in an image data recording unit, such as a memory card, that is not shown. Further, when the image pickup device 1, for example, has a function of inputting/outputting sound, an audio processing unit for performing audio processing, which is not shown, stores audio data upon photographing in the memory 20 via a data conversion unit and an output DMA unit that are not shown. Further, the audio processing unit reads audio data stored in the memory 20 via an input DMA unit and a data inverse-conversion unit that are not shown, and causes a sound output unit such as a speaker, which is not shown, to output sound according to the read audio data.
First Configuration Next, the data conversion units in the image pickup device 1 will be described. Further, as described above, the data conversion unit 41 and the data conversion unit 51 differ from each other only in preceding and subsequent processing blocks connected thereto. More specifically, as shown in FIG. 1, the data conversion unit 41 is arranged between the preceding image pickup processing unit 40 and the subsequent output DMA unit 45, and the data conversion unit 51 is arranged between the preceding image pickup processing unit 50 and the subsequent output DMA unit 55. Accordingly, the data conversion unit 41 and the data conversion unit 51 differ from each other only in data formats of input image data and output image data. Hereinafter, the data conversion unit 41 will be described as a representative.

Figure 2:
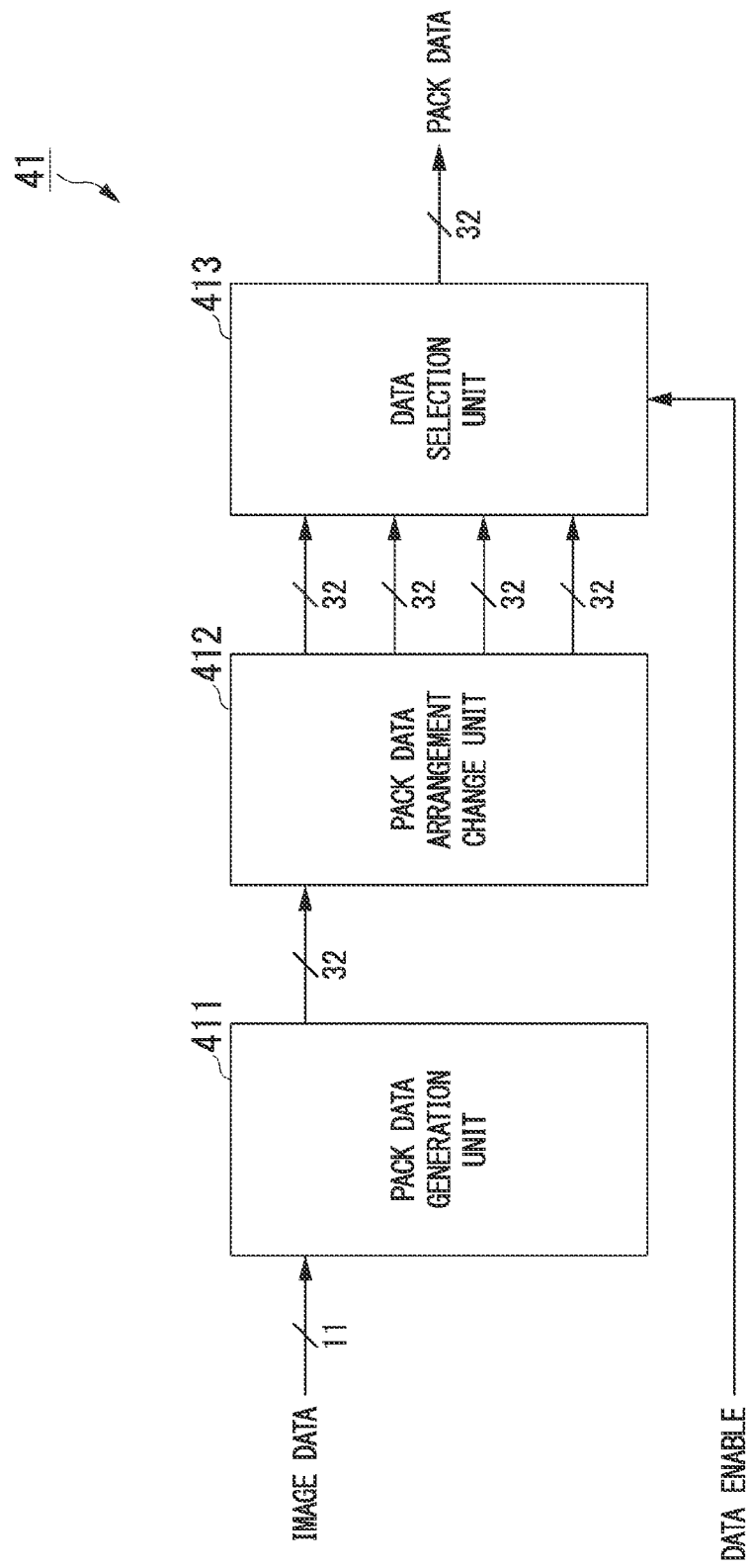
FIG. 2 is a block diagram illustrating a schematic configuration of a data conversion unit of a first configuration included in the image pickup device in accordance with the first preferred embodiment of the present invention.

FIG. 2 is a block diagram illustrating a schematic configuration of the data conversion unit 41 of a first configuration included in the image pickup device 1 in accordance with the first preferred embodiment of the present invention. As shown in FIG. 2, the data conversion unit 41 includes a pack area 1 data generation unit 411, a pack area 2 data generation unit 412, and a data coupling unit 413.

Figure 17:
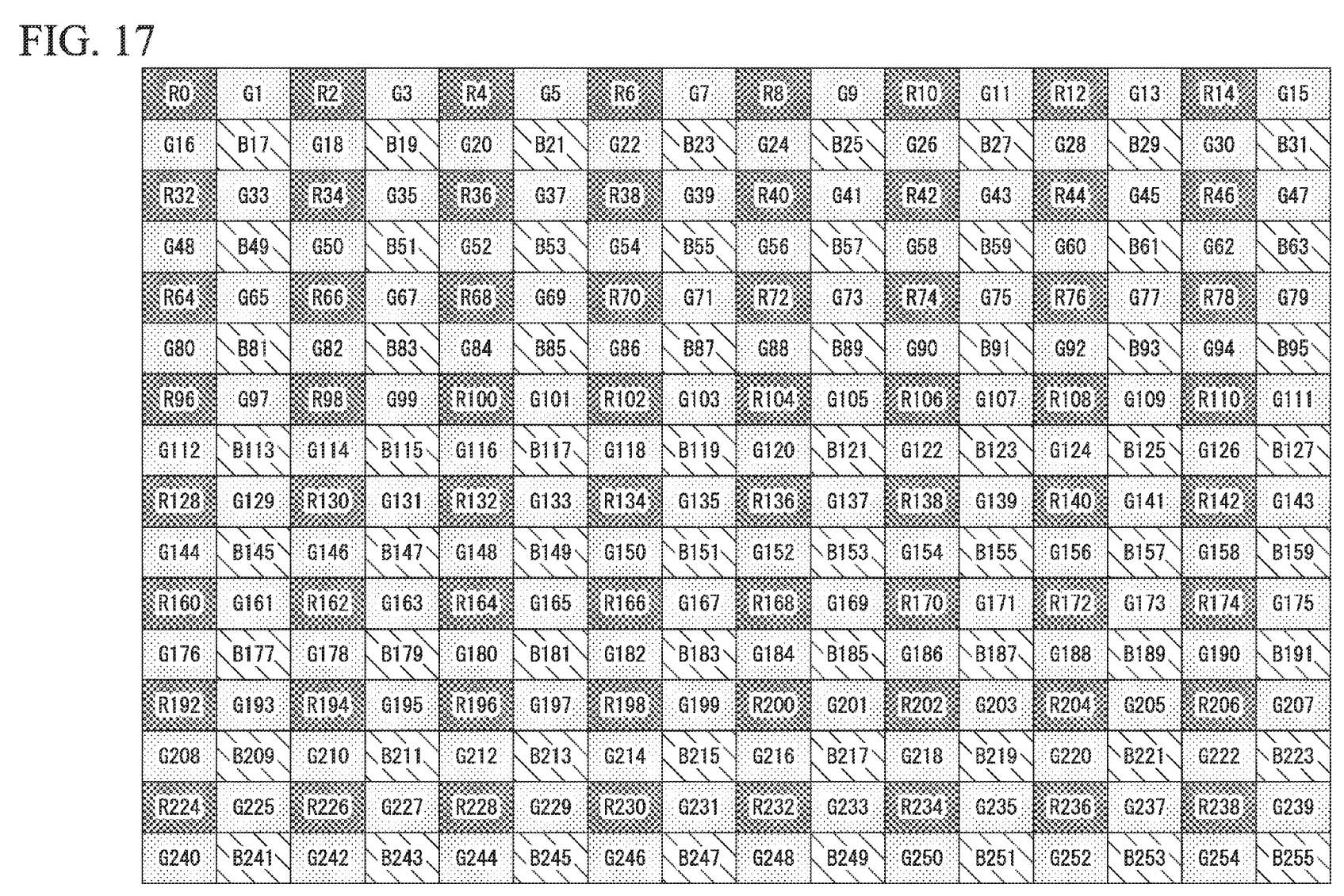

In the following description, it is assumed that the image data having the 16×16 Bayer arrangement as shown in FIG. 17 (hereinafter referred to as "Bayer data") is input to the data conversion unit 41, a packing unit for each pixel data in the Bayer data consists of four transfers, and the four transfers form a burst transfer unit, that is, one burst is a pixel data packing unit. Further, a bit number of each pixel data in the Bayer data is 11, and a bus width of the memory bus (memory bus width) is 32 bits. Further, in the Bayer data shown in FIG. 17, numbers of the pixel data represent positions of a pixel in the CCD 30, and "R," "G," and "B" before the numbers represent colors of the pixel in the CCD 30. More specifically, "R" represents pixel data of a red pixel of the CCD 30, "G" represents pixel data of a green pixel of the CCD 30, and "B" represents pixel data of a blue pixel of the CCD 30.

A data conversion unit 41 generates 32-bit pack data arranged in bits on a memory bus from data of bits of 11-bit pixel data input from an image pickup processing unit 40 in one of predetermined packing methods that will be described later. The data conversion unit 41 sequentially outputs the generated pack data on the basis of a data enable signal input from an output direct memory access (DMA) unit 45. The data enable signal includes information indicating the order of a transfer in which pack data is transferred when an output DMA unit 45 performs a burst transfer.

A pack data generation unit 411 sequentially arranges data of bits of the input pixel data in bits of a data bus corresponding to the memory bus. Here, the data bus is described as a "memory bus" in the following description because the data bus corresponds to bits of the memory bus. Pack data (hereinafter referred to as "transfer pack data") of the number of bits (32 bits in FIG. 2) of a memory bus width in which the pixel data is sequentially arranged is output to a pack data arrangement change unit 412. Because a method in which the pack data generation unit 411 arranges pixel data on the memory bus is the same as a burst unit-based packing method of the related art, detailed description is omitted.

The pack data arrangement change unit 412 generates pack data (hereinafter referred to as "changed pack data") in which the arrangement of pixel data within transfer pack data input from the pack data generation unit 411 is changed. The pack data arrangement change unit 412 outputs the generated changed pack data for one burst to the data selection unit 413.

More specifically, the pack data arrangement change unit 412 generates the changed pack data in which the arrangement of pixel data within the transfer pack data is changed so that adjacent pixel data having the same color is arranged in the same bit on the memory bus with respect to data during two continuous transfers when the pixel data is transferred to the memory 20 in a burst transfer on the basis of a predetermined packing method that will be described later. In the pack data arrangement change unit 412, a change amount of the arrangement of pixel data within the transfer pack data is preset for all pack data, that is, every memory access (one transfer) of one cycle in the burst transfer. The pack data arrangement change unit 412 determines the order of a transfer of input transfer pack data every time the transfer pack data is input from the pack data generation unit 411, and makes an arrangement change of an amount corresponding to its determination result.

Although the pack data arrangement change unit 412 can be configured to sequentially generate changed pack data based on a predetermined packing method that will be described later every time the transfer pack data is input from the pack data generation unit 411 as described above, a memory unit, which temporarily retains, for example, 32-bit transfer pack data of one burst, that is, a packing unit (four transfers), can be configured to be provided within the pack data arrangement change unit 412. In this case, the transfer pack data input from the pack data generation unit 411 is retained once in the memory unit and an arrangement change of an amount corresponding to a result of determining the order of a transfer of transfer pack data is made for all retained transfer pack data.

The data selection unit 413 sequentially selects the changed pack data input from the pack data arrangement change unit 412 on the basis of a data enable signal input from the output DMA unit 45, and outputs the selected changed pack data as pack data generated by the data conversion unit 41 to the output DMA unit 45. The data selection unit 413 determines the order of a transfer in which pack data is transferred in a burst transfer on the basis of the data enable signal, and selects one-changed-pack data within the changed pack data input from the pack data arrangement change unit 412 on the basis of its determination result.

Next, a data reverse conversion unit within an image pickup device 1 will be described. As described above, a difference between data reverse conversion units 52 and 62 is only that a processing block of a connected front stage and a processing block of a connected rear stage are different. More specifically, as illustrated in FIG. 1, the data reverse conversion unit 52 is arranged between a front-stage input DMA unit 56 and a rear-stage image processing unit 50, and the data reverse conversion unit 62 is arranged between a front-stage input DMA unit 66 and a rear-stage display processing unit 60. Accordingly, the difference between the data reverse conversion units 52 and 62 is only that data formats of image data to be input and image data to be output are different. In the following description, the data reverse conversion unit 52 will be representatively described.

FIG. 3 is a block diagram illustrating a schematic configuration of the data reverse conversion unit 52 of a first configuration included in the image pickup device 1 in accordance with the first preferred embodiment of the present invention. As illustrated in FIG. 3, the data reverse conversion unit 52 includes a pack data arrangement change unit 521, a data selection unit 522, and a pack data restoration unit 523.

In the following description, the case where pack data of one burst is input to the data reverse conversion unit 52 via the input DMA unit 56 as a packing unit of four transfers packed by the data conversion unit 41, and the input pack data is restored to Bayer data illustrated in FIG. 17 will be described. Accordingly, the number of bits of pixel data within the Bayer data is described to be 11 and a memory bus width is described to be 32 bits.

The data reverse conversion unit 52 restores data arranged in bits of 32-bit pack data input from the input DMA unit 56 to 11-bit pixel data restored to original image data (Bayer data) to be subjected to image processing by the image processing unit 50 in a method reverse to one of predetermined packing methods that will be described later. The data reverse conversion unit 52 sequentially outputs the original pixel data restored on the basis of the data enable signal input from the input DMA unit 56. The data enable signal includes information indicating the order of a transfer in which the input DMA unit 56 has transferred pack data in a burst transfer.

The pack data arrangement change unit 521 generates pack data (referred to as "transfer pack data" in the following description because the pack data is the same as data obtained by restoring the changed pack data to transfer pack data generated by the pack data generation unit 411) in which the arrangement of pixel data within input pack data (referred to as "changed pack data" in the following description because the pack data is the same as changed pack data generated by the pack data arrangement change unit 412 within the data conversion unit 41) is restored to the original. The pack data arrangement change unit 521 outputs transfer pack data generated for one burst to the data selection unit 522.

More specifically, the pack data arrangement change unit 521 generates the transfer pack data in a method reverse to a predetermined packing method that will be described later. In the pack data arrangement change unit 521, a change amount of the arrangement of pixel data within pack data (changed pack data) is preset for every pack data, that is, every memory access (one transfer) of one cycle in the burst transfer. The pack data arrangement change unit 521 determines the order of a transfer of changed pack data for input pack data every time the pack data (changed pack data) is input from the input DMA unit 56, and makes an arrangement change of an amount corresponding to its determination result.

Although the pack data arrangement change unit 521 can be configured to sequentially generate transfer pack data based on a method reverse to a predetermined packing method that will be described later every time the changed pack data is input from the input DMA unit 56 as described above, a memory unit, which temporarily retains, for example, 32-bit pack data (changed pack data) of one burst, that is, a packing unit (four transfers), can be configured to be provided within the pack data arrangement change unit 521. In this case, the changed pack data input from the input DMA unit 56 is retained once in the memory unit and an arrangement change of an amount corresponding to a result of determining the order of a transfer of the changed pack data is made for each retained changed pack data.

The data selection unit 522 sequentially selects the transfer pack data input from the pack data arrangement change unit 521 on the basis of a data enable signal input from the output DMA unit 56, and outputs the selected transfer pack data to the pack data restoration unit 523. The data selection unit 522 determines the order of a transfer of transfer pack data in a burst transfer on the basis of the data enable signal, and selects one-transfer pack data within the transfer pack data input from the pack data arrangement change unit 521 on the basis of its determination result.

The pack data restoration unit 523 sequentially divides (unpacks) pixel data arranged in bits of the transfer pack data input from the data selection unit 522 and restores the divided pixel data to original pixel data (11-bit pixel data in FIG. 3). The pack data restoration unit 523 sequentially outputs copied original pixel data to the image processing unit 50. Because a method in which the pack data restoration unit 523 restores transfer pack data to original pixel data is the same as a restoration method in the burst unit-based packing method of the related art, detailed description is omitted.

Next, a method of arranging (packing) pixel data will be described. The image pickup device 1 in accordance with the first preferred embodiment of the present invention generates pack data obtained by arranging pixel data input from the data conversion units 41 and 51 on the memory bus, and restores pack data input from the data reverse conversion units 52 and 62 to the original pixel data. In the following description, the case where pixel data within the Bayer data illustrated in FIG. 17 is sequentially input to the data conversion unit 41 and packed into pack data of one burst in which four transfers are designated as one packing unit will be described. In addition, the number of bits of pixel data within the Bayer data is 11 and the memory bus width is 32 bits.

Because a method in which the data reverse conversion units 52 and 62 restore pack data to the original pixel data is reverse to the method in which the data conversion units 41 and 51 pack pixel data, detailed description is omitted.

First Data Arrangement Method

FIGS. 4A and 4B are diagrams illustrating the first data arrangement method (packing method) in the data conversion unit 41 of the first configuration. FIG. 4A illustrates transfer pack data generated by the burst unit-based packing method of the related art, that is, transfer pack data in which bits of pixel data are arranged by the pack data generation unit 411. In addition, FIG. 4B illustrates the arrangement of pixel data within changed pack data in which the arrangement of pixel data is changed in the first packing method.

As described above, in general, a variation amount of pixel data in adjacent pixels is small in image data. Thus, when pack data is constructed, it is preferable to arrange the same bit of pixel data of adjacent pixels in the same bit of the memory bus in each transfer so that a variation amount of each bit of the memory bus is minimized when the burst transfer is performed.

In addition, color information indicating pixel data within image data is different according to an image format such as a Bayer, RGB, or YC422 dot-sequential type when the image processing unit 50 performs image processing. Thus, when pack data is constructed, it is preferable to arrange pixel data of the same color in the same bit of the memory bus in each transfer so that a variation amount of each bit of the memory bus is minimized when a burst transfer is performed.

In the first packing method, the pack data arrangement change unit 412 generates changed pack data in which pixel data of bits for each transfer pack data is bit-shifted so that a bit of a boundary of pixel data is arranged in a preset shift reference position. The shift reference position is preset to a bit position serving as a reference for changing the arrangement of pixel data within transfer pack data so that bit positions of adjacent pixel data having the same color arranged on the memory bus are preferably in the same position in data during two continuous transfers when a burst transfer is performed. The pack data arrangement change unit 412 shifts the arrangement of bits of transfer pack data so that the arrangement of a bit of pixel data within the transfer pack data is in a shift reference position, and changes the arrangement of bits of pixel data within transfer pack data so that the variation of bits on the memory bus is minimized.

It is preferable to set the shift reference position to a position where much pixel data having the same bit in the same color is arranged in the same bit of the memory bus during a plurality of transfers. In addition, when a variation amount of pixel data between adjacent pixels is small in the image data, only a less significant bit is expected to be varied, rather than a more significant bit. Thus, it is preferable to set the shift reference position so that the more significant bit of which a variation amount is small is arranged in the same bit on the memory bus when pixel data within transfer pack data is bit-shifted.

Here, an example of the arrangement (packing) of pixel data in the first packing method will be described using FIGS. 4A and 4B. First, the pack data generation unit 411 generates transfer pack data by packing pixel data "R0," "G1," "R2," "G3," "R4," "G5," "R6," "G7," "R8," "G9," and "R10" within the Bayer data. More specifically, as illustrated in FIG. 4A, the pack data generation unit 411 sequentially arranges (packs) bits [0] to [9] of "R0," "G1," and "R2" in a first transfer, a bit [10] of "R2" and bits [0] to [8] of "G3," "R4," and "G5" in a second transfer, bits [9] and [10] of "G5" and bits [0] to [7] of "R6," "G7," and "R8" in a third transfer, and bits [8] to [10] of "R8," "G9," and "R10" in a fourth transfer in sequence from the least significant bit of the memory bus.

If it is not possible to arrange all bits of pixel data within the packing unit, the pack data generation unit 411 does not pack the next pixel data (for example, pixel data "G11" within Bayer data). This is because the data conversion unit 41 packs pixel data in the packing unit and data of "G11" steps over the packing unit if part of pixel data of "G11" is packed. Accordingly, bits of transfer pack data within the packing unit in which pixel data is not arranged (for example, bits [25] to [31] of transfer pack data of the fourth transfer in FIGS. 4A and 4B) become unused bits. It is possible to arrange and configure data of which all values are the same (for example, all data are 1 or 0) in the unused bits.

Subsequently, the pack data arrangement change unit 412 generates changed pack data by shifting pixel data arranged in bits for each transfer pack data. Here, the shift reference position is set to a boundary position between the bit [10] of "G9" and the bit [0] of "R1" of the fourth transfer illustrated in FIG. 4A. The pack data arrangement change unit 412 generates changed pack data as illustrated in FIG. 4B by shifting bits of the transfer pack data so that the boundary position between the bit [10] of green pixel data and the bit [0] of red pixel data included in the transfer pack data from the first transfer to the third transfer illustrated in FIG. 4A becomes the set shift reference position. More specifically, the pack data arrangement change unit 412 performs an 8-bit shift of the transfer pack data of the first transfer to the right as indicated by an arrow illustrated in FIG. 4A. In addition, the pack data arrangement change unit 412 performs a 2-bit shift of the transfer pack data of the second transfer to the left and performs a 10-bit shift of the transfer pack data of the third transfer to the right.

The pack data arrangement change unit 412 rearranges pixel data of bits, exceeding a memory bus width due to a bit shift of transfer pack data, in opposite-side bits so that the pixel data is circulated within transfer pack data. That is, the pack data arrangement change unit 412 rearranges a less significant bit, exceeding the memory bus width due to a right shift, in a more significant bit of the transfer pack data, and rearranges a more significant bit, exceeding the memory bus width due to a left shift, in a less significant bit of the transfer pack data.

As described above, in the first packing method, it is possible to reduce the variation of a bit position of pixel data on a memory bus during each transfer by generating changed pack data in which pixel data of bits within the transfer pack data is rearranged for each memory access (one transfer) for one cycle in the burst transfer. Thereby, a ratio for adjacent pixel data having the same color arranged in the same bit on the memory bus can be increased and a variation amount of each bit of the memory bus during the burst transfer can be decreased. Thereby, the first packing method can maintain transfer efficiency of image data and also reduce power consumption related to the transfer of image data as in the burst unit-based packing method of the related art.

The generation of changed pack data can be implemented by a simple method of bit-shifting pixel data within transfer pack data for each transfer pack data. Thus, an increase of a circuit scale related to the generation of changed pack data can be minimized.

Second Data Arrangement Method

FIGS. 5A and 5B are diagrams illustrating the second data arrangement method (packing method) in the data conversion unit 41 of the first configuration. FIG. 5A illustrates transfer pack data generated by the burst unit-based packing method of the related art, that is, transfer pack data in which bits of pixel data are arranged by the pack data generation unit 411. In addition, FIG. 5B illustrates the arrangement of pixel data within changed pack data in which the arrangement of pixel data is changed in the second packing method.

In the second packing method, the pack data arrangement change unit 412 generates changed pack data in which pixel data is reordered for each transfer pack data so that a boundary of pixel data is arranged in a preset reordering reference position. The reordering reference position is preset to a bit position serving as a reference for changing the arrangement of pixel data within transfer pack data so that bit positions of adjacent pixel data having the same color arranged on the memory bus are preferably in the same position in data during two continuous transfers when a burst transfer is performed. The pack data arrangement change unit 412 reorders the arrangement of pixel data within transfer pack data so that the arrangement of the pixel data within the transfer pack data is in the reordering reference position and changes the arrangement of pixel data within transfer pack data so that the variation of bits on the memory bus is minimized.

It is preferable to set the reordering reference position to a position where much pixel data having the same bit in the same color is arranged in the same bit of the memory bus for a plurality of transfers. In addition, when a variation amount of pixel data between adjacent pixels is small in the image data, only a less significant bit is expected to be varied, rather than a more significant bit. Thus, it is preferable to set the reordering reference position so that the more significant bit of which a variation amount is small is arranged in the same bit on the memory bus when pixel data within transfer pack data is reordered.

Here, an example of the arrangement (packing) of pixel data in the second packing method will be described using FIGS. 5A and 5B. First, the data pack generation unit 411 generates transfer pack data in which pixel data "R0," "G1," "R2," "G3," "R4," "G5," "R6," "G7," "R8," "G9," and "R10" within the Bayer data is packed. Because a method of generating transfer pack data in the second packing method is the same as in the first packing method, detailed description is omitted.

Subsequently, the pack data arrangement change unit 412 generates changed pack data by reordering pixel data arranged within the transfer pack data for each transfer pack data. Here, the reordering reference position is set to a boundary position between the bit [10] of "R0" and the bit [0] of "G1" of the first transfer illustrated in FIG. 5A. The pack data arrangement change unit 412 generates changed pack data as illustrated in FIG. 5B by reordering pixel data within the transfer pack data so that the boundary position between the bit [10] of red pixel data and the bit [0] of green pixel data included in the transfer pack data from the second transfer to the fourth transfer illustrated in FIG. 5A becomes the set reordering reference position. More specifically, the pack data arrangement change unit 412 reorders bits [10] of "G3," "R4," and "R2" of the second transfer as indicated by an arrow illustrated in FIG. 5A. In addition, the pack data arrangement change unit 412 reorders transfer pack data of the second transfer by shifting the transfer pack data of the third transfer to the right by 2 bits. Bits [9] and [10] of "G5" exceeding the memory bus width due to a bit shift are rearranged in more significant bits of the transfer pack data so that the bits [9] and [10] of "G5" are circulated in the transfer pack data of the second transfer. In addition, the pack data arrangement change unit 412 reorders bits [8] to [10] of "G9," "R10," and "R8" of the fourth transfer.

As described above, in the second packing method, it is possible to reduce the variation of a bit position of pixel data on a memory bus during each transfer by generating changed pack data in which pixel data within the transfer pack data is rearranged for each memory access (one transfer) for one cycle in the burst transfer. Thereby, a ratio for adjacent pixel data having the same color arranged in the same bit on the memory bus can be increased as in the first packing method and a variation amount of each bit of the memory bus during the burst transfer can be decreased. Thereby, the second packing method can maintain transfer efficiency of image data and also reduce power consumption related to the transfer of image data as in the first packing method.

Although the case where pixel data included in transfer pack data is collectively reordered for each color when the pixel data within the transfer pack data is rearranged in the second packing method illustrated in FIGS. 5A and 5B, a method of reordering the pixel data is not limited to the second packing method. That is, it is possible to apply another reordering method as long as the other reordering method is a method in which image data of the same bit in the same color is arranged in the same bit on the memory bus during two continuous transfers. For example, pixel data can be divided into bits, and pixel data of the same bit in the same color can be arranged in the same bit on the memory bus during two continuous transfers for each division bit. Thereby, it is possible to further reduce power consumption related to the transfer of image data.

In addition, the generation of changed pack data can be implemented by a simple method of reordering the arrangement of pixel data within transfer pack data for each transfer pack data. Thus, an increase of a circuit scale related to the generation of changed pack data can be minimized.

Third Data Arrangement Method

FIGS. 6A and 6B are diagrams illustrating the third data arrangement method (packing method) in the data conversion unit 41 of the first configuration. FIG. 6A illustrates the arrangement of pixel data within changed pack data in which the arrangement of pixel data is changed in the first packing method. FIG. 6B illustrates the arrangement of pixel data within changed pack data in which the arrangement of pixel data is changed in the third packing method.

In the third packing method, the pack data arrangement change unit 412 changes the arrangement of pixel data within the transfer pack data so that adjacent pixel data having the same color is arranged in the same bit on the memory bus during two continuous transfers as in the first or second packing method. Further, in the third packing method, the pack data arrangement change unit 412 rearranges pixel data having the same bit as pixel data arranged in the changed pack data of the last transfer in unused bits of the transfer pack data within the packing unit, that is, copies and arranges the pixel data. Because a method of arranging pixel data other than unused bits of the transfer pack data within the packing unit and changing the arrangement in the third packing method is the same as the first or second packing method, detailed description is omitted.

Here, the arrangement of pixel data of unused bits by the pack data arrangement change unit 412 will be described more specifically. In the following description, an example in which the third packing method is applied to changed pack data generated by the first packing method as illustrated in FIG. 6A will be described. It is also possible to equally consider the case where the third packing method is applied to changed pack data generated by the first packing method. The pack data arrangement change unit 412 copies pixel data arranged in bits [25] to [31] of a data bus of the third transfer (bits [1] to [7] of the pixel data "R6" in FIGS. 6A and 6B) in unused bits of the fourth transfer (bits [25] to [31] of the changed pack data of the fourth transfer in FIGS. 6A and 6B), and rearranges the copied pixel data.

As described above, in the third packing method, the same value as that of pixel data arranged in the last transfer is arranged in unused bits of transfer pack data within the packing unit (see the fourth transfer in FIGS. 6A and 6B). Thereby, it is possible to reduce a variation amount of each bit of a memory bus during a burst transfer, particularly, a variation amount of unused bits of the transfer pack data, more than in the first or second packing method. Thereby, the third packing method can reduce power consumption related to the transfer of image data more than the first or second packing method.

As described above, the data conversion units 41 and 51 of the first configuration can change the arrangement of pixel data within the transfer pack data so that a variation amount of each bit of the memory bus is reduced during a burst transfer. Thereby, the data conversion unit 41 and 51 of the first configuration can maintain the transmission efficiency of image data as in the burst unit-based packing method of the related art, and reduce power consumption related to the transfer of image data more than the burst unit-based packing method of the related art. Thereby, it is possible to reduce power consumption related to the transfer of image data between each component (processing block) within the image pickup device 1 and the memory 20, that is, the delivery of pixel data between components within the image pickup device 1.

In addition, the data conversion units 41 and 51 of the first configuration can generate changed pack data in a simple method. Thus, it is possible to minimize an increase of a circuit scale related to the generation of changed pack data.

Second Configuration

Figure 7:
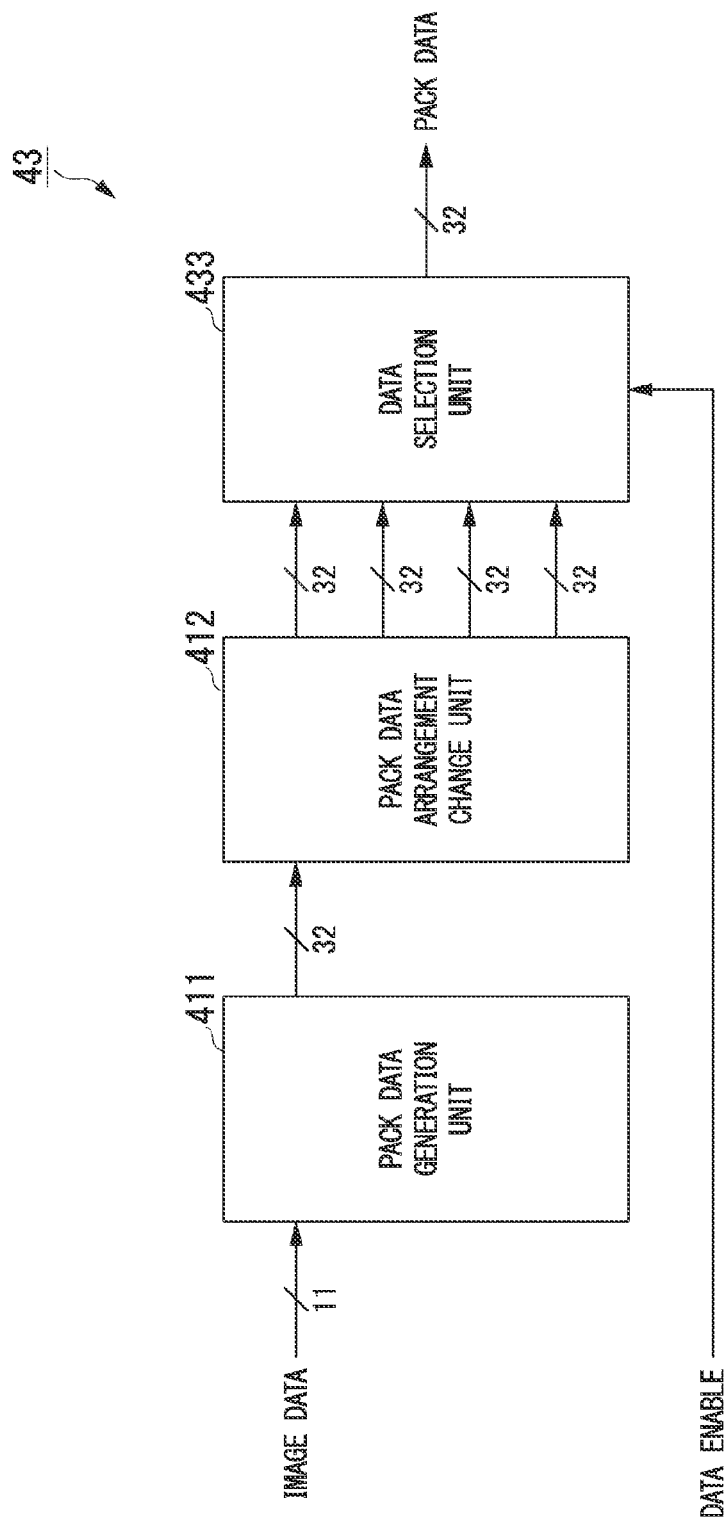
FIG. 7 is a block diagram illustrating a schematic configuration of the data conversion unit of the second configuration included in the image pickup device in accordance with the first preferred embodiment of the present invention.

Next, the data conversion unit of the second configuration will be described. FIG. 7 is a block diagram illustrating a schematic configuration of the data conversion unit 43 of the second configuration included in the image pickup device 1 in accordance with the first preferred embodiment of the present invention. The data conversion unit 43 illustrated in FIG. 7 is included in the image pickup device 1 in place of the data conversion unit 41 of the first configuration. Accordingly, the data conversion unit 43 can be included in the image pickup device 1 in place of the data conversion unit 51. As illustrated in FIG. 7, the data conversion unit 43 includes a pack data generation unit 411, a pack data arrangement change unit 412, and a data selection unit 433.

A difference between the data conversion unit 43 of the second configuration and the data conversion unit 41 of the first configuration illustrated in FIG. 2 is only that the data selection unit 433 is included in place of the data selection unit 413 within the data conversion unit 41 of the first configuration. Accordingly, the same reference numerals are assigned to the same components as those within the data conversion unit 41 of the first configuration in the following description, and detailed description thereof is omitted.

In the following description, the case where (16 rows×16 columns) Bayer data as illustrated in FIG. 17 is input to the data conversion unit 43 as in the first configuration, four transfers are designated as a packing unit of pixel data within the Bayer data, the number of bits of pixel data within the Bayer data is 11, and the burst bus width is 32 bits will be described.

Like the data conversion unit 41 of the first configuration, the data conversion unit 43 outputs 32-bit pack data arranged in bits on the memory bus from data of bits of 11-bit pixel data input from the image pickup processing unit 40 in a predetermined packing method. However, a pack data output method is different from that of the data conversion unit 41 of the first configuration. Details regarding the pack data output method by the data conversion unit 43 will be described later.

Like the data selection unit 413 within the data conversion unit 41 of the first configuration, the data selection unit 433 selects changed pack data input from the pack data arrangement change unit 412 on the basis of a data enable signal input from the output DMA unit 45, and outputs the selected changed pack data as pack data generated by the data conversion unit 43 to the output DMA unit 45. However, the data selection unit 433 interchanges the order of changed pack data to be output to the output DMA unit 45 on the basis of a predetermined output order change method that will be described later without sequentially selecting changed pack data input from the pack data arrangement change unit 412 on the basis of the data enable signal.

A memory unit, which temporarily retains, for example, 32-bit changed pack data of one burst, that is, a packing unit (four transfers), can be configured to be provided within the data selection unit 433, and the changed pack data sequentially input from the pack data arrangement change unit 412 is retained once. The data selection unit 433 determines the order of a transfer in which pack data is transferred in a burst transfer on the basis of the data enable signal, selects one changed pack data within the retained changed pack data on the basis of its determination result, and outputs the selected changed pack data to the output DMA unit 45.

Figure 8:
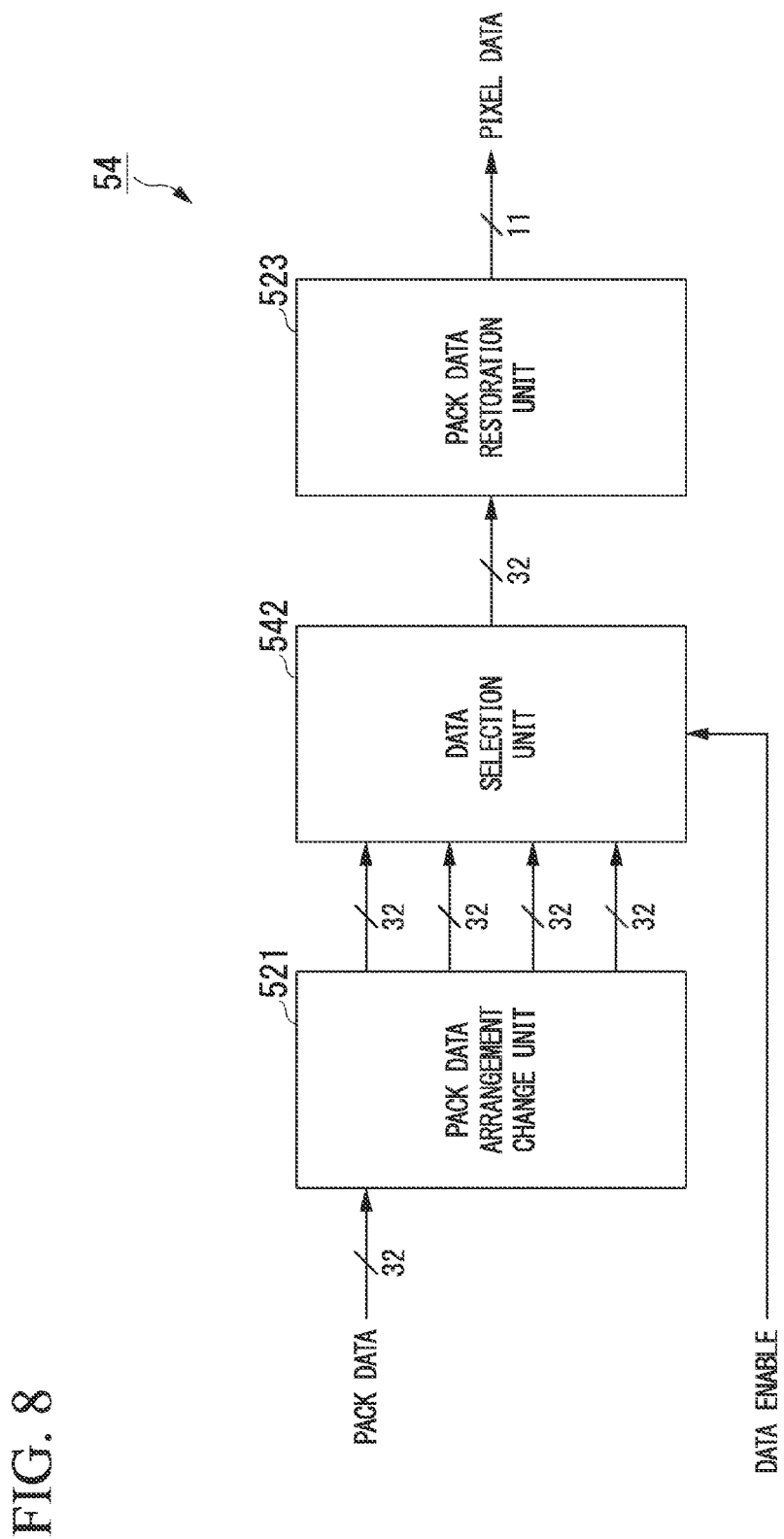
FIG. 8 is a block diagram illustrating a schematic configuration of the data reverse conversion unit of the second configuration included in the image pickup device in accordance with the first preferred embodiment of the present invention.

Next, the data reverse conversion unit of the second configuration will be described. FIG. 8 is a block diagram illustrating a schematic configuration of the data reverse conversion unit 54 of the second configuration included in the image pickup device 1 in accordance with the first preferred embodiment of the present invention. In place of the data reverse conversion unit 52 of the first configuration, the data reverse conversion unit 54 illustrated in FIG. 8 is included in the image pickup device 1. Accordingly, in place of the data conversion unit 62, the data reverse conversion unit 54 can be included in the image pickup device 1. As illustrated in FIG. 8, the data reverse conversion unit 54 includes a pack data arrangement change unit 521, a data selection unit 542, and a pack data restoration unit 523.

A difference between the data reverse conversion unit 54 of the second configuration and the data reverse conversion unit 52 of the first configuration illustrated in FIG. 3 is only that the data selection unit 542 is included in place of the data selection unit 522 within the data reverse conversion unit 52 of the first configuration. Accordingly, in the following description, the same reference numerals are assigned to the same components as those within the data reverse conversion unit 52 of the first configuration, and detailed description thereof is omitted.

In the following description, the case where pack data of one burst as a packing unit of four transfers packed by the data conversion unit 43 is input to the data reverse conversion unit 54 via the input DMA unit 56, and the input pack data is restored to the Bayer data illustrated in FIG. 17 as in the first configuration will be described. Accordingly, the number of bits of pixel data within the Bayer data is described to be 11 and the memory bus width is described to be 32 bits.

Like the data reverse conversion unit 52 of the first configuration, the data reverse conversion unit 54 outputs 11-bit pixel data by restoring data arranged in bits of 32-bit pack data input from the input DMA unit 56 to the original image data (Bayer data) for image processing by the image processing unit 50 in a method reverse to a predetermined packing method. However, because pack data of which the order is different from that of the data reverse conversion unit 52 of the first configuration is input to the data reverse conversion unit 54, image data is output to the image processing unit 50 by restoring the order of image data to the original order.

Like the data selection unit 522 within the data reverse conversion unit 52 of the first configuration, the data selection unit 542 selects transfer pack data input from the pack data arrangement change unit 521 on the basis of the data enable signal input from the input DMA unit 56, and outputs the selected transfer pack data to the pack data restoration unit 523. However, without sequentially selecting changed pack data input from the pack data arrangement change unit 521 on the basis of the data enable signal, the data selection unit 542 interchanges the order of the changed pack data input from the pack data arrangement change unit 521 to the order reverse to that of a predetermined output order change method that will be described later, that is, restores the order of the changed pack data to the original order, and outputs its result to the pack data restoration unit 523.

A memory unit, which temporarily retains, for example, 32-bit changed pack data of one burst, that is, a packing unit (four transfers), is configured to be provided within the data selection unit 542, and the changed pack data sequentially input from the pack data arrangement change unit 521 is retained once. The data selection unit 542 determines the order of a transfer in which pack data is transferred in a burst transfer on the basis of the data enable signal, selects one changed pack data within the changed pack data retained on the basis of its determination result, and outputs the selected changed pack data to the pack data restoration unit 523.

Next, a method of changing the output order of pack data (an output order change method) in the second configuration will be described. In the image pickup device 1 in accordance with the first preferred embodiment of the present invention, for example, the data conversion unit 43 generates pack data in which input pixel data is arranged on the memory bus and the data reverse conversion unit 54 restores input pack data to the original pixel data. Accordingly, even when the order of pack data to be output by the data conversion unit 43 is different, the data reverse conversion unit 54 restores the order of input pack data to the original, so that a series of processes can be executed in the image pickup device 1 in accordance with the first preferred embodiment of the present invention with no difficulty. In the following description, the case where pixel data within the Bayer data illustrated in FIG. 17 is sequentially input to the data conversion unit 43 and packed to pack data of one burst having four transfers as one packing unit will be described. In addition, the number of bits of pixel data within the Bayer data is 11 and the burst bus width is 32 bits.

Because a method in which the data reverse conversion unit 54 restores the order of pack data to the original order is reverse to a method in which the data conversion unit 43 changes the output order of pack data, detailed description is omitted.

Data Output Order Change Method

FIGS. 9A and 9B are diagrams illustrating the data output order change method in the data conversion unit 43 of the second configuration. FIG. 9A illustrates the arrangement of pixel data within changed pack data in which the arrangement of pixel data is changed in the first packing method described above. FIG. 9B illustrates the arrangement of pixel data within changed pack data in which the output order of changed pack data is interchanged in the data output order change method.

The pack data arrangement change unit 412 may increase a ratio for pixel data of the same color arranged in the same bit on the memory bus in data during two continuous transfers by interchanging the order of changed pack data within one burst (four-changed-pack data in FIGS. 9A and 9B), for example, even after the changed pack data is generated by the first packing method.

In this data output order change method, the data selection unit 433 interchanges the order in which the changed pack data generated by the pack data arrangement change unit 412 is output on the basis of the predetermined output order of changed pack data. The order in which the changed pack data is output is preset to the order in which the changed pack data is output within the packing unit so that a ratio for pixel data having the same color arranged in the same bit on the memory bus is preferably increased in data during two continuous transfers in which a burst transfer is performed. On the basis of the data enable signal, the data selection unit 433 selects changed pack data input from the pack data arrangement change unit 412 in the preset output order of changed pack data.

Here, an example in which the output order of changed pack data is interchanged by this data output order change method will be described using FIGS. 9A and 9B. First, the pack data arrangement change unit 412 generates changed pack data by the first packing method. Detailed description of a method of generating the changed pack data in the first packing method is omitted. Thereafter, the data selection unit 433 interchanges the order for all changed pack data.

In the example illustrated in FIGS. 9A and 9B, the data selection unit 433 interchanges changed pack data of a second transfer to a fourth transfer, interchanges changed pack data of a third transfer to the second transfer, and interchanges changed pack data of the fourth transfer to the third transfer as illustrated in FIG. 9A. Thereby, the order of changed pack data output from the data selection unit 433 becomes the order illustrated in FIG. 9B.

As described above, the order in which changed pack data is output is interchanged. For example, in FIGS. 9A and 9B, bits [0] to [7] of "R0" and bits [0] to [7] of "R6" divided and arranged on the memory bus of a high-order side of the first and third transfers are continuously arranged in the first and second transfers. Thereby, it is possible to reduce a variation amount of each bit of the memory bus in the first and second transfers when a burst transfer is performed more than in the first packing method. Thereby, it is possible to further reduce power consumption related to the transfer of image data.

Although an example in which the order of changed pack data generated by the first packing method is interchanged in the data output order change method illustrated in FIGS. 9A and 9B have been described, it is also possible to equally consider and apply the case where the order of changed packing data generated by the above-described second packing method is interchanged.

In addition, the same concept as in the above-described third packing method is applicable to this data output order change method. However, in this case, the data selection unit 433 copies pixel data of the same bit as that of pixel data arranged in changed pack data of one transfer immediately before or after unused bits of the changed pack data, and arranges the copied pixel data in the unused bits.

As described above, the data conversion unit 43 of the second configuration can interchange the order of changed pack data within the packing unit so that a ratio for pixel data having the same color arranged in the same bit on the memory bus is increased during two continuous transfers when a burst transfer is performed. Thereby, the data conversion unit 43 of the second configuration can also maintain the transmission efficiency of image data as in the burst unit-based packing method of the related art, and reduce power consumption related to the transfer of image data more than in the burst unit-based packing method of the related art. Thereby, as in the data conversion units 41 and 51 of the first configuration, it is possible to reduce power consumption related to the transfer of image data between each component (processing block) within the image pickup device 1 and the memory 20, that is, the delivery of pixel data between components within the image pickup device 1.

Although a data processing apparatus and method in which a packing method and a data output order change method in accordance with the first preferred embodiment of the present invention are applied to Bayer data have been described in the above-described embodiments, a packing method and a data output order change method in accordance with the first preferred embodiment of the present invention are not limited to an application to Bayer data. The present invention is applicable to various types of image data such as RGB data, YCbCr data based on the YC422 or YC444 point-sequential format, or on-screen display (OSD) data. In addition, the packing method and the data output order changing method in accordance with the first preferred embodiment of the present invention are not limited to an application to image data, and are applicable to other format data such as audio data.

Application Example

Next, an example in which the packing method in accordance with the first preferred embodiment of the present invention is applied to image data of other formats or data other than image data will be described. Because it is possible to equally consider the case where the data output order change method in accordance with the first preferred embodiment of the present invention is applied to image data of other formats or data other than image data as in the above-described data output order change method, detailed description is omitted.

First, an example in which the packing method in accordance with the first preferred embodiment of the present invention is applied to RGB data will be described. FIGS.

10A and 10B are diagrams illustrating an example in which a data arrangement method (packing method) by the data conversion unit 41 included in the image pickup device 1 in accordance with the first preferred embodiment of the present invention is applied to other image data (RGB data). FIG. 10A illustrates an example in which the burst unit-based packing method of the related art is applied to 10-bit RGB data, that is, an example of transfer pack data in which bits of pixel data are arranged by the pack data generation unit 411. FIG. 10B illustrates an example in which the first packing method is applied to 10-bit RGB data.

As illustrated in FIG. 10A, the pack data generation unit 411 generates transfer pack data in which RGB data (10 bits×3 colors=30 bits) is simply arranged. In terms of the transfer pack data, all bits of the 32-bit memory bus become pixel data of different colors. As illustrated in FIG. 10B, the pack data arrangement change unit 412 changes (bit-shifts) the arrangement of pixel data within transfer pack data by the first packing method, and generates changed pack data in which a ratio for pixel data of the same color arranged in the same bit on the memory bus is increased.

In the example of the FIGS. 10A and 10B, a shift reference position is set to a boundary position between a bit [9] of "G3" and a bit [0] of "B3" of the fourth transfer, and the pack data arrangement change unit 412 shifts transfer pack data of the first transfer to the right by 6 bits, shifts transfer pack data of the second transfer to the right by 4 bits, and shifts transfer pack data of the third transfer to the right by 2 bits. Thereby, it is possible to reduce a variation amount of each bit of four-changed-pack data and reduce power consumption related to the transfer of image data.

Figure 11A:
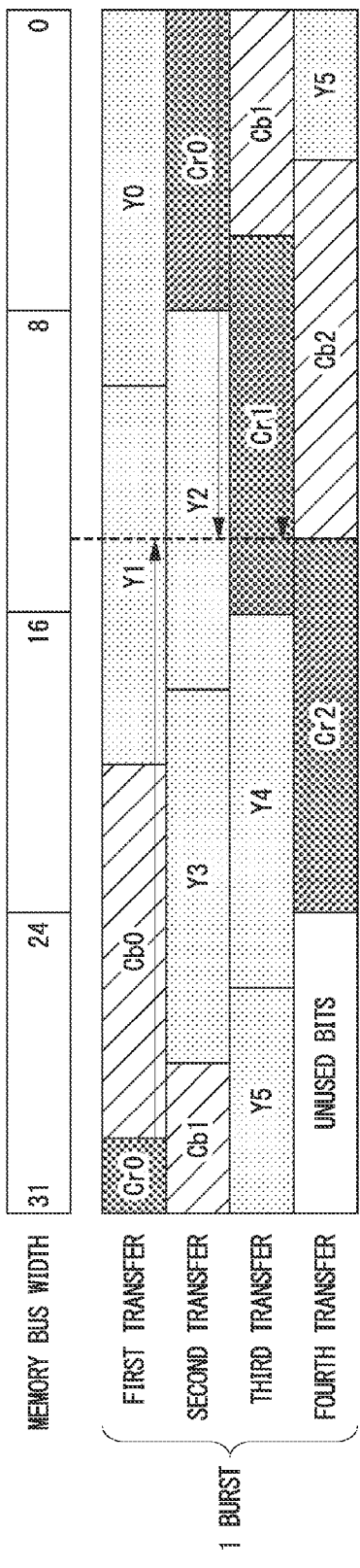
FIGS. 11A and 11B are diagrams illustrating an example in which the data arrangement method by the data conversion unit included in the image pickup device in accordance with the first preferred embodiment of the present invention is further applied to other image data.
Figure 11B:
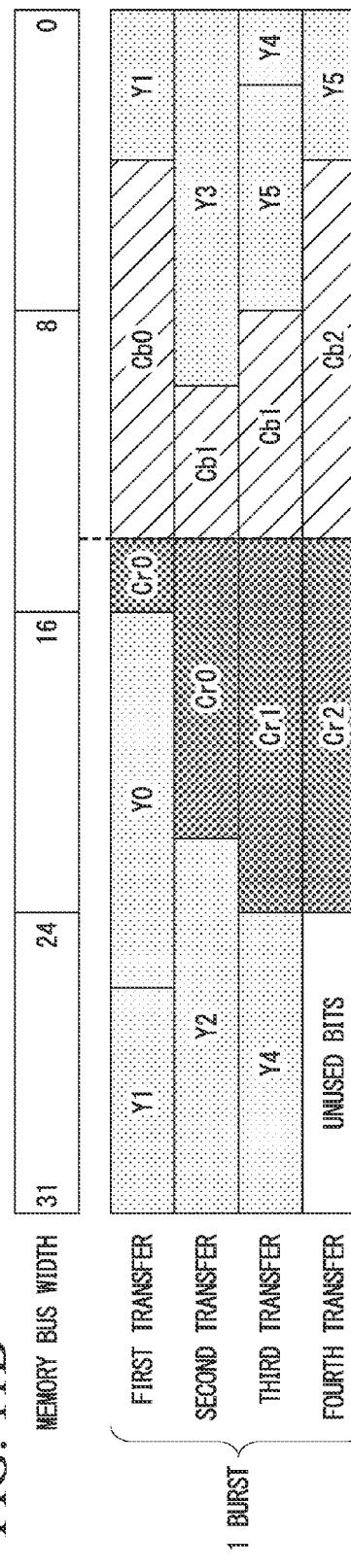

FIGS. 11A and 11B are diagrams illustrating an example in which the data arrangement method (packing method) by the data conversion unit 41 included in the image pickup device 1 in accordance with the first preferred embodiment of the present invention is further applied to other image data (YCbCr data). FIG. 11A illustrates an example in which the burst unit-based packing method of the related art is applied to 10-bit Y, Cb, and Cr data, that is, an example of transfer pack data in which bits of pixel data are arranged by the pack data generation unit 411. FIG. 11B illustrates an example in which the first packing method is applied to 10-bit Y, Cb, and Cr data.

As illustrated in FIG. 11A, the pack data generation unit 411 generates transfer pack data in which YCbCr data is simply arranged. In terms of the transfer pack data, all bits of the memory bus become pixel data indicating different colors. As illustrated in FIG. 11B, the pack data arrangement change unit 412 changes (bit-shifts) the arrangement of pixel data within transfer pack data by the first packing method, and generates changed pack data in which a ratio for pixel data indicating the same color arranged in the same bit on the memory bus is increased.

In the example of the FIGS. 11A and 11B, a shift reference position is set to a boundary position between a bit [9] of "Cb2" and a bit [0] of "Cr2" of the fourth transfer, and the pack data arrangement change unit 412 shifts transfer pack data of the first transfer to the right by 16 bits, shifts transfer pack data of the second transfer to the left by 14 bits, and shifts transfer pack data of the third transfer to the left by 8 bits. Thereby, it is possible to reduce a variation amount of each bit of four-changed-pack data and reduce power consumption related to the transfer of image data.

FIGS. 12A and 12B are diagrams illustrating an example in which the data arrangement method (packing method) by the data conversion unit 41 included in the image pickup device 1 in accordance with the first preferred embodiment of the present invention is further applied to other image data (OSD data). FIG. 12A illustrates an example in which the burst unit-based packing method of the related art is applied to 6-bit OSD data, that is, an example of transfer pack data in which bits of pixel data are arranged by the pack data generation unit 411. FIG. 12B illustrates an example in which the first packing method is applied to 6-bit OSD data.

As illustrated in FIG. 12A, the pack data generation unit 411 generates transfer pack data in which OSD data is simply arranged. In terms of the transfer pack data, all bits of the memory bus become different bits of different display data. As illustrated in FIG. 12B, the pack data arrangement change unit 412 changes (bit-shifts) the arrangement of display data within transfer pack data by the first packing method, and generates changed pack data in which a ratio for the same bit of each display data arranged in the same bit on the memory bus is increased.

In the example of the FIGS. 12A and 12B, a shift reference position is set to a boundary position between a bit [5] of "OSD1" and a bit [0] of "OSD2" of the first transfer, and the pack data arrangement change unit 412 shifts transfer pack data of the second transfer to the left by 2 bits, and shifts transfer pack data of the third transfer to the right by 2 bits. Because the transfer pack data of the first transfer has the same bit arrangement as display data, a display data arrangement change (bit shift) is not made. Thereby, it is possible to reduce a variation amount of each bit of four-changed-pack data and reduce power consumption related to the transfer of image data.

Figure 13A:
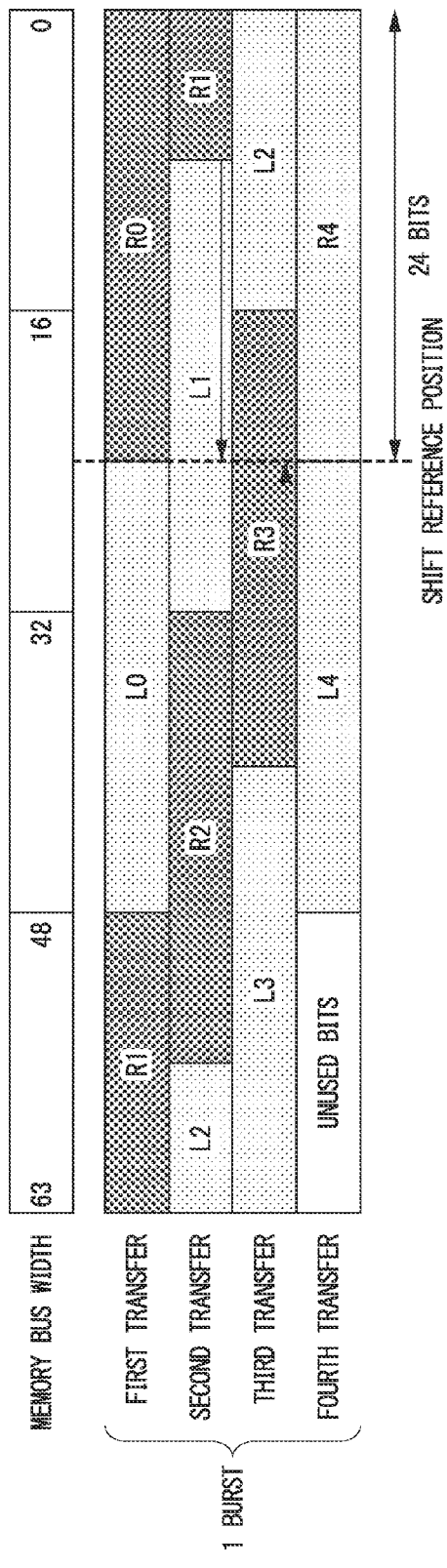
FIGS. 13A and 13B are diagrams illustrating an example in which the data arrangement method by the data conversion unit included in the image pickup device in accordance with the first preferred embodiment of the present invention is applied to other data.
Figure 13B:
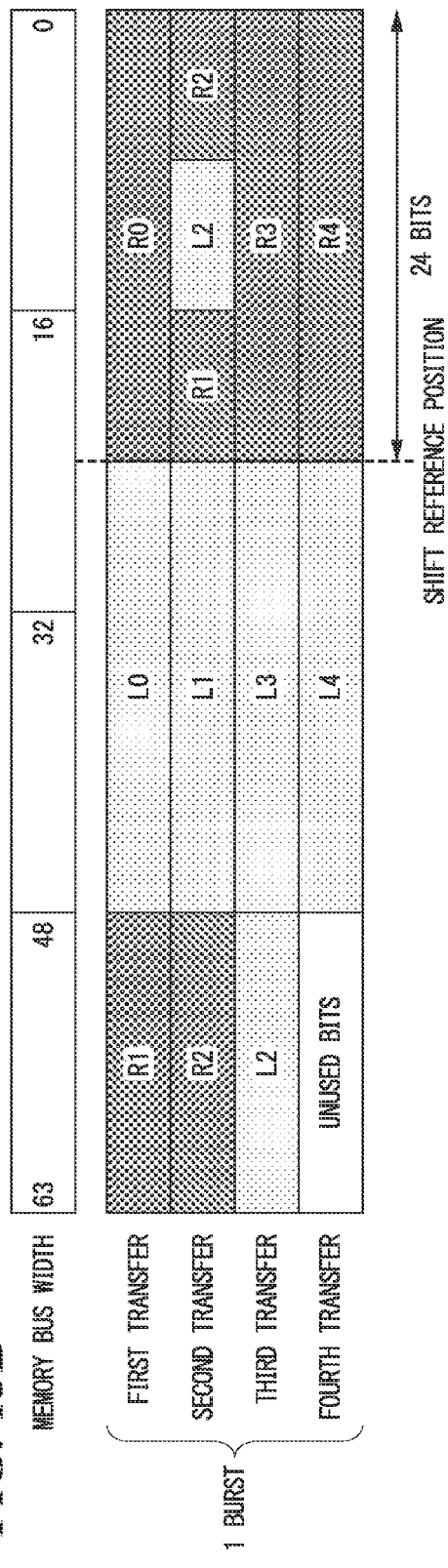

FIGS. 13A and 13B are diagrams illustrating an example in which the data arrangement method (packing method) by the data conversion unit 41 included in the image pickup device 1 in accordance with the first preferred embodiment of the present invention is applied to other data (audio data). FIGS. 13A and 13B illustrate the case where 24-bit right (R) data and 24-bit left (L) data are applied to a 64-bit memory bus. FIG. 13A illustrates an example in which the burst unit-based packing method of the related art is applied, that is, an example of transfer pack data in which bits of audio data are arranged by the pack data generation unit 411. FIG. 13B illustrates an example in which the first packing method is applied.

As illustrated in FIG. 13A, the pack data generation unit 411 generates transfer pack data in which audio data is simply arranged. In terms of the audio data, all bits of the memory bus become audio data of different bits. As illustrated in FIG. 13B, the pack data arrangement change unit 412 changes (bit-shifts) the arrangement of audio data within transfer pack data by the first packing method, and generates changed pack data in which a ratio for the same bit of audio data of the same side arranged in the same bit on the memory bus is increased.

In the example of the FIGS. 13A and 13B, a shift reference position is set to a boundary position between a bit [23] of "R0" and a bit [0] of "L0" of the first transfer, and the pack data arrangement change unit 412 shifts transfer pack data of the second transfer to the left by 16 bits, and shifts transfer pack data of the third transfer to the right by 16 bits. Because the transfer pack data of the first transfer has the same bit arrangement as audio data, an audio data arrangement change (bit shift) is not made. Thereby, it is possible to reduce a variation amount of each bit of four-changed-pack data and reduce power consumption related to the transfer even in data of other formats other than image data.

According to the embodiment of the present invention as described above, the arrangement of data arranged on a memory bus within transfer pack data is changed. Thereby, it is possible to increase a ratio at which the same bit of data arranged on the memory bus is arranged in the same bit on the memory bus during two continuous transfers when a burst transfer is performed. In addition, according to the embodiment of the present invention, the order of pack data within the packing unit is interchanged. Thereby, it is possible to further increase a ratio at which the same bit of data arranged on the memory bus is arranged in the same bit on the memory bus during two continuous transfers when a burst transfer is performed. Thereby, it is possible to reduce a variation amount of each bit of the memory bus during two continuous transfers when a burst transfer is performed. Moreover, the data transfer efficiency equal to that of the related art can be maintained. Thereby, it is possible to sufficiently obtain the effect of reducing power consumption related to the delivery of data between each component (processing block) within the image pickup device and the memory.

Although the case where four transfers are designated as a unit of one burst transfer and one burst is designated as a data packing unit has been described in the first preferred embodiment of the present invention, the number of transfers in one burst transfer or a data packing unit is not limited to the embodiment of the present invention. For example, 64 transfers are designated as a unit of one burst transfer and 16 transfers within one burst is designated as the data packing unit. That is, it is possible to configure four packing units within one burst. In addition, for example, 16 transfers are designated as the data packing unit and 8 transfers are designated as a unit of one burst transfer. That is, it is possible to configure the packing unit over two burst transfers.

In addition, although the packing method when data is delivered between components within the image pickup device is applied to some data has been described in the first preferred embodiment of the present invention, a range in which the packing method of the first preferred embodiment of the present invention is applicable is not limited to the embodiment of the present invention. The present invention is applicable to any system in which data is delivered between components.

Although an example in which the data conversion unit is arranged as a front-stage processing block of the output DMA unit and the data reverse conversion unit is arranged as a rear-stage processing block of the input DMA unit has been described in the first preferred embodiment of the present invention, the data conversion unit and the data reverse conversion unit are not limited to the embodiment of the present invention. For example, it is possible to configure the data conversion unit as a component within the output DMA unit or configure the data reverse conversion unit as a component within the input DMA unit. In addition, it is possible to configure the data conversion unit as a component within a front-stage image processing unit or configure the data reverse conversion unit as a component within a rear-stage image processing unit.

In addition, although an example in which the number of bits of data is the same has been described in the first preferred embodiment of the present invention, the number of bits of data is not limited to the preferred embodiment of the present invention. The present invention is equally applicable even when the number of bits of data is different between data having different types of information.

In addition, although the case where a bit position (a shift reference position or a reordering reference position) serving as a reference for changing a data position is set to a data boundary and the arrangement of data is changed according to one-transfer pack data within four-transfer pack data has been described in the first preferred embodiment of the present invention, the setting of the bit position serving as the reference is not limited to the preferred embodiment of the present invention.

Figures 14A, 14B, 14C:
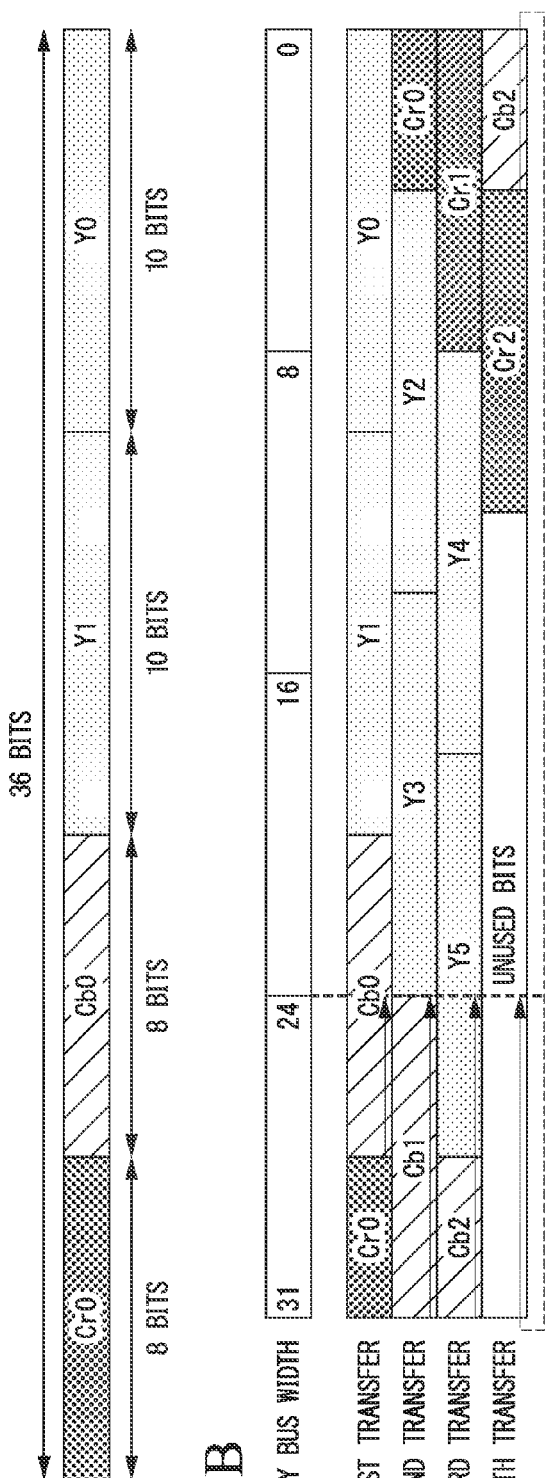
FIGS. 14A, 14B, and 14C are diagrams illustrating an example in which data of another configuration is applied to a data arrangement method by the data conversion unit included in the image pickup device in accordance with the first preferred embodiment of the present invention.
Figure 16:
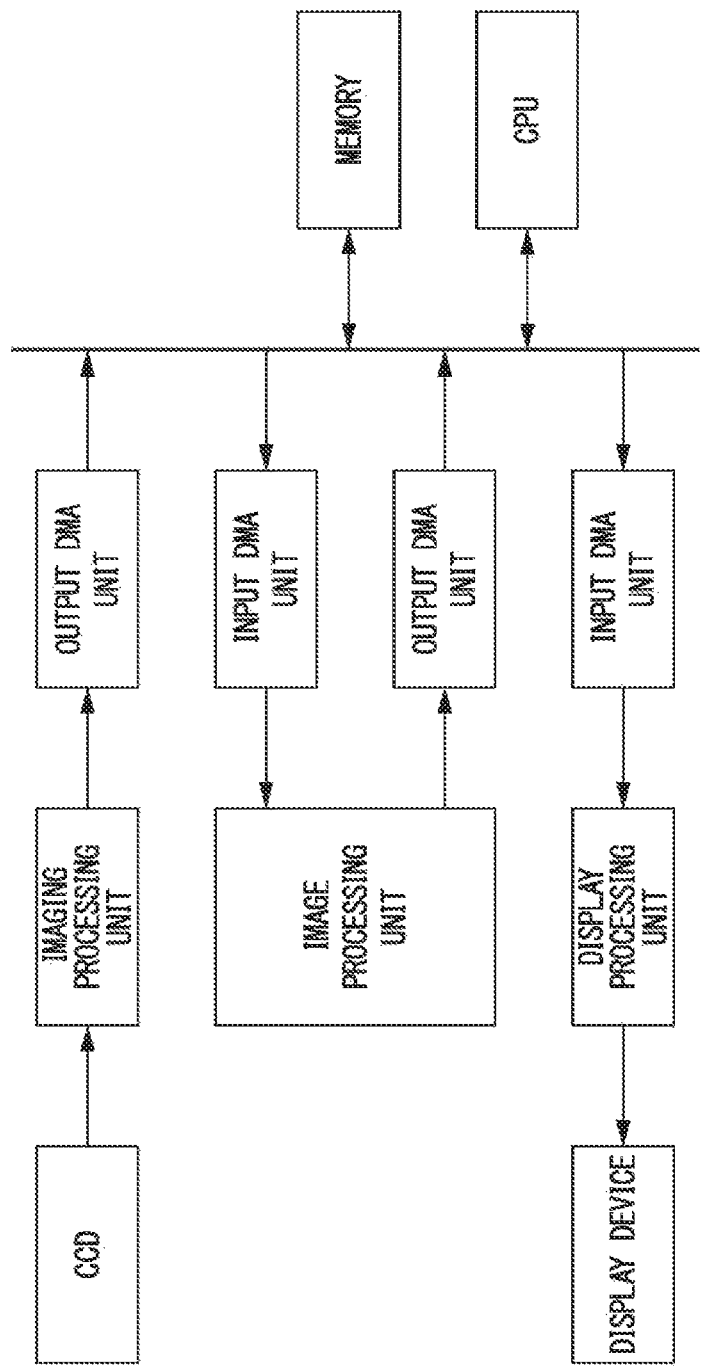
FIG. 16 is a block diagram illustrating a schematic configuration of an image pickup device in accordance with the related art.
Figure 19A:
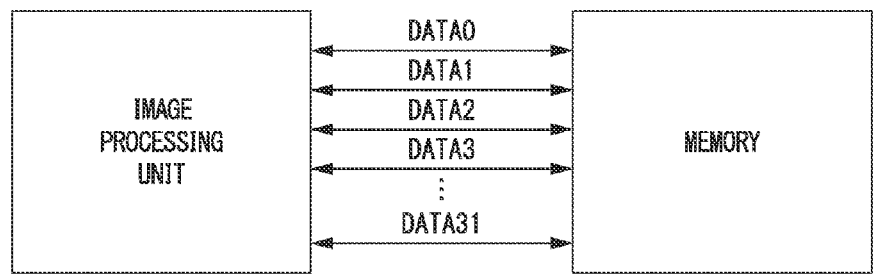
FIGS. 19A, 19B, 19C and 19D are diagrams illustrating a relationship between a data change on a data bus and a power consumption.
Figure 19B:
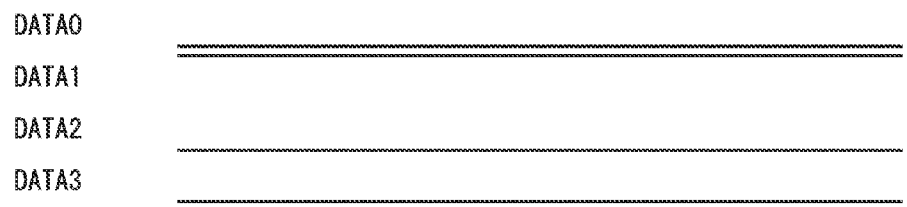
Figure 19C:
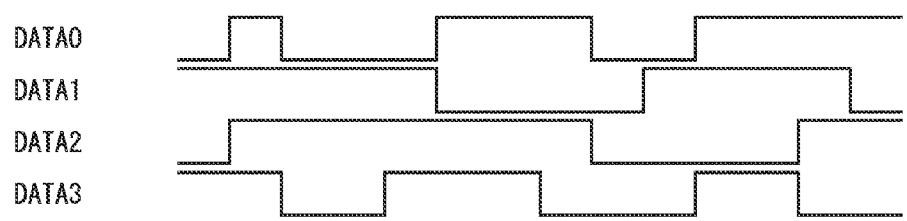
Figure 19D:
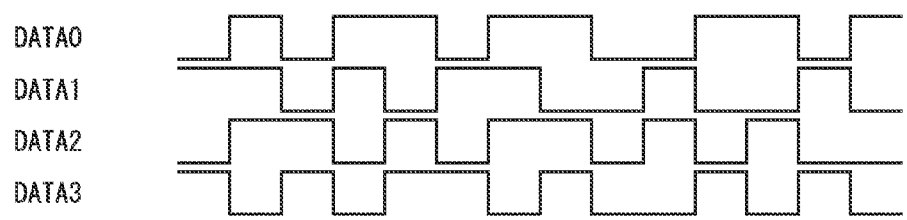
Figure 20A:
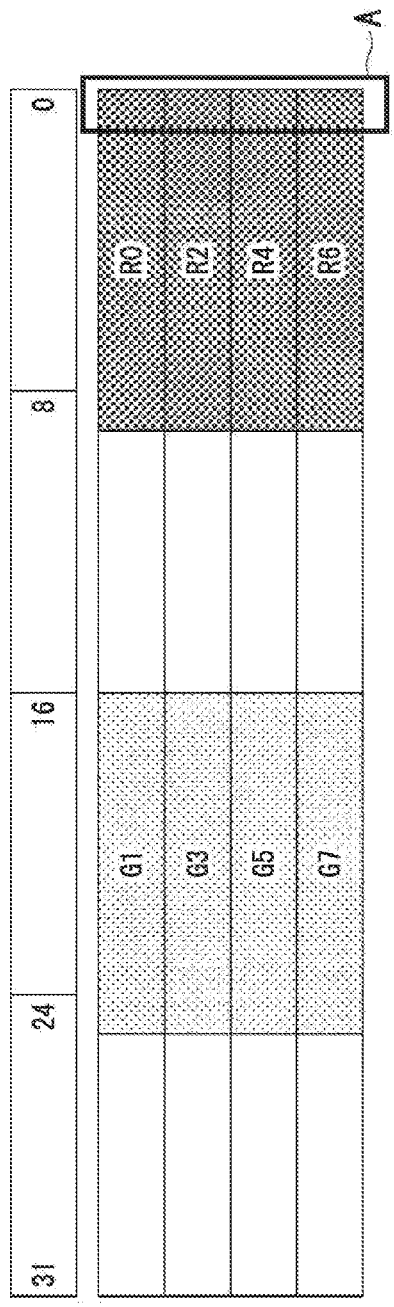
FIGS. 20A and 20B are diagrams illustrating an example of a data arrangement state in a pixel data packing method in accordance with the related art.
Figure 20B:
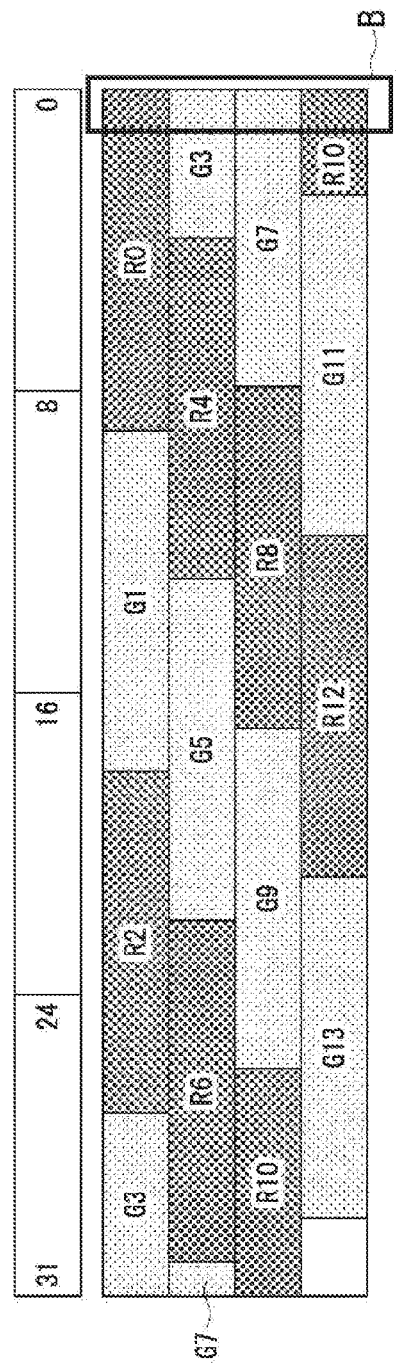

For example, the present invention is applicable to data of other configurations as illustrated in FIGS. 14A, 14B, and 14C. FIGS. 14A, 14B, and 14C are diagrams illustrating an example in which data (YCbCr data) of another configuration is applied to a data arrangement method by the data conversion unit 41 included in the image pickup device 1 in accordance with the first preferred embodiment of the present invention. FIG. 14B illustrates an example in which the burst unit-based packing method of the related art is applied to 10-bit Y data, 8-bit Cb data, and 8-bit Cr data as illustrated in FIG. 14A, that is, an example of transfer pack data in which bits of pixel data are arranged by the pack data generation unit 411. FIG. 14C illustrates an example in which the first packing method is applied to 10-bit Y data, 8-bit Cb data, and 8-bit Cr data as illustrated in FIG. 14A.

As illustrated in FIG. 14B, all bits of the memory bus become transfer pack data in which pixel data indicating different colors is arranged if the pack data generation unit 411 generates the transfer pack data in which YCbCr data is simply arranged. Even in this case, as illustrated in FIG. 14C, the pack data arrangement change unit 412 can generate changed pack data in which a ratio for pixel data indicating the same color arranged in the same bit on the memory bus is increased by changing (bit-shifting) the arrangement of pixel data within transfer pack data by the first packing method.

In the example of the FIGS. 14A, 14B, and 14C, a shift reference position is set to a 24th bit of the memory bus, and the pack data arrangement change unit 412 shifts transfer pack data of the first transfer to the right by 4 bits, shifts transfer pack data of the second transfer to the right by 8 bits, shifts transfer pack data of the third transfer to the right by 8 bits, and shifts transfer pack data of the fourth transfer to the right by 12 bits. As described above, the pack data arrangement change unit 412 can change the arrangement of data even when the shift reference position is different from a data boundary position in one-transfer pack data within four-transfer pack data. Thereby, it is possible to further reduce a variation amount of each bit of changed pack data and further reduce power consumption related to the transfer of data.

In addition, although an example in which the data arrangement method in accordance with the first preferred embodiment of the present invention is applied when unused bits are included only in specific one-transfer pack data has been described in the first preferred embodiment of the present invention, transfer pack data to which the data arrangement method in accordance with the first preferred embodiment of the present invention is applicable is not limited to the embodiment of the present invention. For example, it is possible to apply the data arrangement method in accordance with the first preferred embodiment of the present invention even when data is arranged by the data packing method of the related art as illustrated in FIG. 21.

Figure 21:
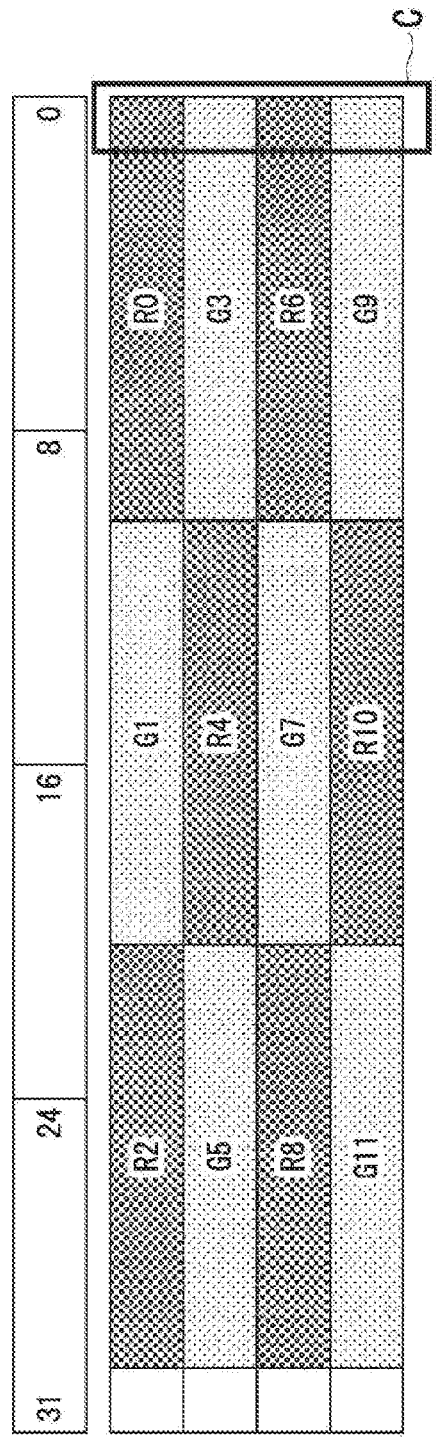
FIG. 21 is a diagram illustrating another example of a data arrangement state in the pixel data packing method in accordance with the related art.

FIGS. 15A and 15B are diagrams illustrating an example in which the data arrangement method by the data conversion unit 41 included in the image pickup device 1 in the image pickup device 1 in accordance with the first preferred embodiment is applied to transfer pack data arranged by the data packing method of the related art illustrated in FIG. 21. FIG. 15A illustrates an example in which the burst unit-based packing method of the related art is applied, that is, the same example as transfer pack data illustrated in FIG. 21 in which bits of pixel data are arranged by the pack data generation unit 411. FIG. 15B illustrates an example in which the first packing method is applied.

As illustrated in FIG. 15A, if the pack data generation unit 411 generates transfer pack data in which RGB data (10 bits×3 colors=30 bits) is simply arranged not to step over one transfer unit, all bits of the memory bus become transfer pack data in which pixel data indicating different colors is arranged. In addition, unused bits are included in transfer pack data. Even in this case, as illustrated in FIG. 15B, the pack data arrangement change unit 412 can generate changed pack data in which a ratio for pixel data indicating the same color arranged in the same bit on the memory bus is increased by changing (bit-shifting) the arrangement of pixel data within transfer pack data by the first packing method.

In the example of FIGS. 15A and 15B, a shift reference position is set to a 10th bit of the memory bus, that is, a boundary position between a bit [9] of "R0" and a bit [0] of "G1" of the first transfer, and the pack data arrangement change unit 412 shifts transfer pack data of a second transfer to the right by 10 bits, and shifts transfer pack data of a fourth transfer to the right by 10 bits. The pack data arrangement change unit 412 rearranges pixel data of bits exceeding a memory bus width due to a bit shift of transfer pack data in bits in which opposite-side pixel data is arranged so that the pixel data is circulated. That is, the pack data arrangement change unit 412 rearranges bit pixel data exceeding the memory bus width due to a shift in bits (bits other than unused bits) in which pixel data is arranged in transfer pack data. This is the same as in the case in which pixel data is reordered for each transfer pack data so that a boundary of pixel data is arranged in a predetermined reordering reference position.

As described above, it is possible to reduce the variation of a position of pixel data arranged on a memory bus during each transfer by shifting (reordering) pixel data arranged in transfer pack data. Thereby, a ratio for adjacent pixel data having the same color arranged in the same bit on the memory bus can be increased and a variation amount of each bit of the memory bus during the burst transfer can be decreased. Thereby, it is possible to maintain transfer efficiency of image data as in the burst unit-based packing method of the related art and reduce power consumption related to the transfer of image data more than in the burst unit-based packing method of the related art.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A data processing apparatus comprising:
a data conversion unit configured to designate one-transfer data as one transfer unit and designate a predetermined number of transfer units as one conversion unit when a plurality of input data sequentially input is converted into transfer data of which the number of bits is the same as that of a data bus having a predetermined number of bits, and the transfer data is sequentially transferred, and arrange the input data in the transfer data within the conversion unit,
wherein the data conversion unit comprises:
a data generation unit configured to generate first transfer data by sequentially arranging the input data on the data bus;
a first data arrangement change unit configured to generate changed data in which a position of the input data arranged within the first transfer data is changed so that the same bit of the input data having the same type of information in the plurality of input data arranged in the first transfer data is continuously transferred in the same bit of the data bus; and
a first data selection unit configured to sequentially select the changed data in which the position of the input data is changed by the first data arrangement change unit and output the selected changed data as the transfer data in the data conversion unit, wherein
a reference position for reordering the input data having a predetermined type of information included in the first transfer data is predetermined by designating the input data having the same type of information as a reordering unit so that each bit of the input data included in the changed data during two continuous transfers included in the same conversion unit is in substantially the same position, and
the first data arrangement change unit performs the reordering in the reordering unit so that the predetermined bit position of the input data having the predetermined type of information arranged within the first transfer data becomes the reference position for each first transfer data.

2. The data processing apparatus according to claim 1, wherein the reference position is preset so that the same bit of two adjacent input data having the same type of information is allocated to the same bit in the changed data of the transfer unit.

3. The data processing apparatus according to claim 2, wherein the reference position is set so that a ratio for a more significant bit of the input data allocated to the same bit of the changed data of two continuous transfer units included in the same conversion unit is increased.

4. The data processing apparatus according to claim 3, wherein, after arrangement of the input data within the first transfer data is changed, the same data as the same bit of the changed data of the transfer unit immediately before inclusion in the same conversion unit is allocated to remaining bits of the changed data in which the input data is not arranged.

5. The data processing apparatus according to claim 3, wherein, when selecting the changed data input from the first data arrangement change unit, the first data selection unit selects the changed data in a predetermined selection order so that a ratio of allocation to the same bit of the changed data of two continuous transfer units included in the same conversion unit is increased.

6. The data processing apparatus according to claim 5, wherein, after selecting the changed data input from the first data arrangement change unit, when bits remain in which the input data is not arranged within the selected changed data, the first data selection unit allocates the same data as the same bit of the changed data of the transfer unit either immediately after or before inclusion in the same conversion unit to the remaining bits.

7. A data processing apparatus comprising:
a data reverse conversion unit configured to convert a plurality of input data to transfer data having the same number of bits as a data bus of which the number of bits is predetermined, to designate one-transfer data as one transfer unit, to designate a predetermined number of transfer units as one conversion unit, and to perform restoration to a plurality of original input data by sequentially reversely converting transfer data sequentially transferred for each conversion unit, wherein the data reverse conversion unit comprises:

a second data arrangement change unit configured to generate changed data in which a position of the input data arranged within first transfer data is changed so that a data processing apparatus of a transfer source of the transfer data generates the first transfer data as a transfer data by sequentially arranging the input data on the data bus and the same bit of the input data having the same type of information in the plurality of input data arranged within the first transfer data is continuously transferred in the same bit of the data bus, sequentially select the changed data in which arrangement of the input data is changed, and perform restoration to the first transfer data by changing a position of the input data arranged within the changed data to an original arrangement position of the input data so that the selected changed data is input from the data bus and arrangement of a plurality of input data arranged within the input changed data is restored to an original position;

a second data selection unit configured to sequentially select the first transfer data in which arrangement of the input data is restored to the original arrangement by the second data arrangement change unit; and a data restoration unit configured to restore the input data included in the first transfer data selected by the second data selection unit to each input data, wherein the changed data is data in which a position of a predetermined bit of the input data having a predetermined type of information included in the first transfer data is reordered to a predetermined reference position by designating the input data having the same type of information as a reordering unit so that bits of the input data included in the transfer data during two continuous transfers included in the same conversion unit are in substantially the same position, and the second data arrangement change unit performs reordering in the reordering unit so that the position of the predetermined bit of the input data having the predetermined type of information arranged within the first transfer data becomes an original position for each changed data.

8. The data processing apparatus according to claim 7, wherein the reference position is preset so that the same bit of two adjacent input data having the same type of information within the input data is allocated to the same bit in the changed data of the transfer unit.

9. The data processing apparatus according to claim 8, wherein the reference position is set so that a ratio for a more significant bit of the input data allocated to the same bit of the changed data of two continuous transfer units included in the same conversion unit is increased.

10. The data processing apparatus according to claim 9, wherein the same data as the same bit of the changed data of the transfer unit immediately before inclusion in the same conversion unit is allocated to the changed data.

11. The data processing apparatus according to claim 9, wherein the same data as the same bit of the changed data of the transfer unit either immediately before or after inclusion in the same conversion unit is allocated to the changed data.

12. The data processing apparatus according to claim 11, wherein, when selecting the first transfer data input from the second data arrangement change unit, the second data selection unit selects the first transfer data in a predetermined selection order so that the first transfer data of two continuous transfer units included in the same conversion unit is in an original order.

* * * * *